United States Patent
Hintermann et al.

(10) Patent No.: US 9,809,727 B2
(45) Date of Patent: Nov. 7, 2017

(54) PHOTO-LATENT TITANIUM-OXO-CHELATE CATALYSTS

(75) Inventors: Tobias Hintermann, Therwil (CH); Antoine Carroy, Limburgerhof (DE); Caroline Lordelot, Mannheim (DE); Didier Bauer, Kembs (FR); Rachel Kohli Steck, Basel (CH); Marc Faller, Hegenheim (FR)

(73) Assignee: BASF SE, Ludwigshafen (DE)

( * ) Notice: Subject to any disclaimer, the term of this patent is extended or adjusted under 35 U.S.C. 154(b) by 76 days.

(21) Appl. No.: 14/007,688

(22) PCT Filed: Apr. 2, 2012

(86) PCT No.: PCT/EP2012/055920
§ 371 (c)(1),
(2), (4) Date: Sep. 26, 2013

(87) PCT Pub. No.: WO2012/136606
PCT Pub. Date: Oct. 11, 2012

(65) Prior Publication Data
US 2014/0018461 A1    Jan. 16, 2014

Related U.S. Application Data

(60) Provisional application No. 61/471,704, filed on Apr. 5, 2011.

(30) Foreign Application Priority Data

Apr. 5, 2011 (EP) .................................... 11161087

(51) Int. Cl.
*C08G 18/22* (2006.01)
*C09D 175/16* (2006.01)
(Continued)

(52) U.S. Cl.
CPC ........ *C09D 175/16* (2013.01); *B01J 31/0208* (2013.01); *B01J 31/2234* (2013.01);
(Continued)

(58) Field of Classification Search
None
See application file for complete search history.

(56) References Cited

U.S. PATENT DOCUMENTS 5,545,600 A    8/1996  Knudsen et al.
5,767,302 A    6/1998  Ogi
(Continued)

FOREIGN PATENT DOCUMENTS

JP            497226     1/1974
JP        2006206781     8/2006
(Continued)

OTHER PUBLICATIONS

Cox et al., Beta Diketone complexes of titanium, Journal of Chemical Society, 1965, p. 2840-2844.*
(Continued)

*Primary Examiner* — Jeffrey Washville
(74) *Attorney, Agent, or Firm* — Lowenstein Sandler LLP

(57) ABSTRACT

A titanium-oxo-chelate catalyst formulation, comprising: (i) at least one compound of the formula (I), wherein $R_1$, $R_2$, $R_3$, $R_4$, $R_5$, $R_6$, $R_7$, $R_8$, $R_9$, $R_{10}$, $R_{11}$ and $R_{12}$ independently of each other are for example hydrogen, halogen, $C_1$-$C_{20}$alkyl, $C_6$-$C_{14}$aryl which is unsubstituted or substituted; or $R_1$, $R_2$ and $R_3$ and/or $R_4$, $R_5$ and $R_6$ and/or $R_7$, $R_8$ and $R_9$ and/or $R_{10}$, $R_{11}$ and $R_{12}$ together with the C-atom to which they are attached each form a $C_6$-$C_{14}$aryl group which is unsubstituted or substituted; or $R_1$ and $R_2$ and/or $R_4$ and $R_5$ and/or $R_7$ and $R_8$ and/or $R_{10}$ and $R_{11}$ together with the C-atom to which they are attached form a 5- to 7-membered carbocyclic ring; at least one chelate ligand compound of the formula (IIa), (IIb) or (IIc), wherein $R_1$, $R_2$, $R_3$, $R_4$, $R_5$ and $R_6$ are defined as above for formula (I), is suitable as photolatent catalyst formulation for polymerizing compounds, which are capable to crosslink in the presence of a Lewis acid.

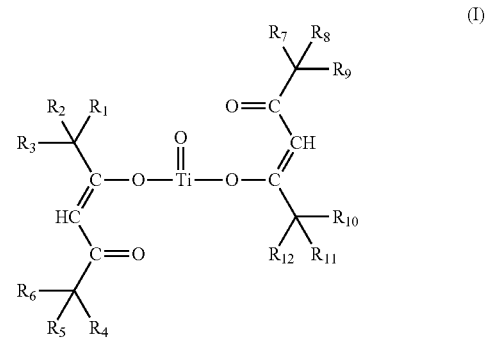

(I)

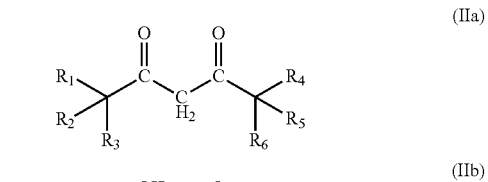

(IIa)

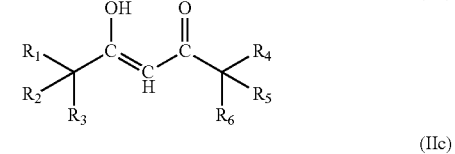

(IIb)

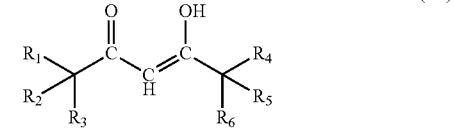

(IIc)

13 Claims, No Drawings

(51) Int. Cl.
    *C08G 18/68* (2006.01)
    *B01J 31/22* (2006.01)
    *C08G 18/62* (2006.01)
    *C08G 18/79* (2006.01)
    *C09J 175/04* (2006.01)
    *B01J 31/02* (2006.01)

(52) U.S. Cl.
    CPC ....... *C08G 18/222* (2013.01); *C08G 18/6229* (2013.01); *C08G 18/68* (2013.01); *C08G 18/792* (2013.01); *C09J 175/04* (2013.01); *B01J 2231/14* (2013.01); *B01J 2231/48* (2013.01); *B01J 2531/46* (2013.01); *Y02P 20/52* (2015.11)

(56) References Cited

U.S. PATENT DOCUMENTS

| | | | | |
|---|---|---|---|---|
| 6,485,554 | B1 * | 11/2002 | Itsuki et al. | 106/287.18 |
| 2002/0032300 | A1 | 3/2002 | Dowling et al. | |
| 2010/0055474 | A1 | 3/2010 | Bachon et al. | |

FOREIGN PATENT DOCUMENTS

| | | |
|---|---|---|
| JP | 2006206781 A | 8/2006 |
| JP | 2008280434 A | 11/2008 |
| WO | 2001051536 | 7/2001 |
| WO | 2006/136211 | 12/2006 |
| WO | 2007/147851 | 12/2007 |
| WO | 2009/050115 | 4/2009 |
| WO | 2011/032875 | 3/2011 |
| WO | 2011032837 A1 | 3/2011 |

OTHER PUBLICATIONS

English language abstract of JP2006206781 Aug. 10, 2006.
English language abstract of JP2008280434 Nov. 20, 2008.
International Search Report Oct. 8, 2013.
Translation of Office Action for Japanese Patent Application No. 2014-503098, dated Jan. 5, 2016, 10 pages.

* cited by examiner

PHOTO-LATENT TITANIUM-OXO-CHELATE CATALYSTS

The present invention pertains to compositions comprising photolatent titanium oxo-chelate catalyst compounds and their application as catalysts in particular for crosslinking 2 pot polyurethane and novel photolatent titanium oxo-chlate catalyst compounds.

It is known in the art to prepare for example polyurethanes (PU) by crosslinking isocyanate components with polyols, including any hydroxyl-functional compounds and also polythiols, in the presence of an organometallic, in particular a tin, catalyst. Corresponding catalysts are known from many publications, for example U.S. Pat. No. 5,545,600. The same type of organometallic catalyst can also be used in order to catalyze the crosslinking via other condensation or addition reactions, such as for example siloxane modified binders as they are used in silane crosslinking adhesives or sealings, as reported for example in WO2006/136211.

The standard catalysts used today are based on Sn compounds. These catalysts are not latent and thus the reaction between the polyol and the poly-isocyanates is accelerated as soon as the catalyst is added. After a short reaction time (around 0.5 h to 2 h, depending on the concentrations and the conditions), the reaction is completed. This reaction time limits the working window with the resin system after the mixture has been produced. Thus it is highly desirable to be able to trigger the reaction only on demand through an external activation such as heat or light. This would allow extending the working window with the resins mixture ideally until the external trigger is turned on. A further problem underlying the invention resides in the legislative pressure on tin catalysts due to the environmental issues raised by these products. A general trend seen in this industry is the replacement of tin catalysts by alternative metals, less or not detrimental to the environment.

Photo-latent catalysts for PU crosslinking have been reported in prior art (e.g. WO2007/147851, WO2009/050115. These catalysts can be activated by irradiation with UV light.

The prior art describes mostly photo-latent tin-catalysts, but also Bi, Zr, Al, and Ti catalysts. Photo-latent Ti catalysts are of very high interest because they perform as good as photo-latent Sn catalysts, but do not have the environmental issues associated with Sn. These Ti catalysts do show a nice photo-latent behavior, but PU formulations containing them do have a pot-life that is not sufficient for a practical industrial application. WO2011/032875 describes the use of specific combinations of Ti-chelate complexes Ti(chelate)$_2$(OR)$_2$ with an excess of specific chelate ligands which leads to an improvement of pot-life of the formulation while maintaining a good photo-latency of the catalyst. The addition of only a small amount of specific 1,3-diketones to the photo-latent Ti complexes leads to a longer pot-life, but equivalent photo-latency compared with the state of the art. These catalysts are however extremely sensitive towards hydrolysis and therefore have to be handled with special care and under strict exclusion of humidity. Storage of the catalysts is thus often accompanied by a loss in activity. Metal-oxo chelate catalysts and the combination with 1,3-diketones are mentioned in JP2006/206781 as crosslinking catalysts for polyurethane resins as well as for hardening of silicon compositions in JP2008/280434. However, the two references do not disclose photo-latent catalysts or latent catalysts concepts.

This invention pertains to the use of Ti-oxo chelate complex compounds which can be prepared under controlled hydrolysis conditions from Ti-alkoxo chelate compounds and have high stability towards water and thus can be easily stored even in the presence of humidity. The Ti-oxo chelate catalyst compounds (and catalyst/1,3-diketone combinations) which are the object of the present invention were surprisingly found to be as reactive and photo-latent as the Ti-alkoxo chelate compounds (and catalyst/1,3-diketone combinations) as crosslinking catalyst for polyurethane.

Subject of the invention is a titanium-oxo-chelate catalyst formulation, comprising
(i) at least one compound of the formula I

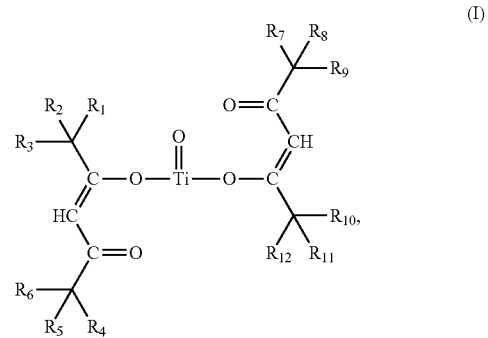

wherein
$R_1$, $R_2$, $R_3$, $R_4$, $R_5$, $R_6$, $R_7$, $R_8$, $R_9$, $R_{10}$, $R_{11}$ and $R_{12}$ independently of each other are hydrogen, halogen, $C_1$-$C_{20}$alkyl, $C_6$-$C_{14}$aryl which is unsubstituted or substituted by one or more $C_1$-$C_8$alkyl, halogen, $OR_{13}$ or $NR_{13}R_{14}$;
provided that only one of $R_1$, $R_2$ and $R_3$ in the group

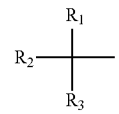

and only one of $R_4$, $R_5$ and $R_6$ in the group

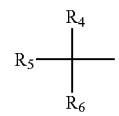

and only one of $R_7$, $R_8$ and $R_9$ in the group

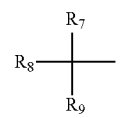

and only one of $R_{10}$, $R_{11}$ and $R_{12}$ in the group

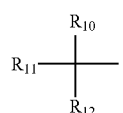

can be hydrogen;
or $R_1$, $R_2$ and $R_3$ and/or $R_4$, $R_5$ and $R_6$ and/or $R_7$, $R_8$ and $R_9$ and/or $R_{10}$, $R_{11}$ and $R_{12}$ together with the C-atom to which they are attached each form a $C_6$-$C_{14}$aryl group which is unsubstituted or substituted by one or more $C_1$-$C_8$alkyl, halogen, $OR_{13}$ or $NR_{13}R_{14}$;
or $R_1$ and $R_2$ and/or $R_4$ and $R_5$ and/or $R_7$ and $R_8$ and/or $R_{10}$ and $R_{11}$ together with the C-atom to which they are attached form a 5- to 7-membered carbocyclic ring;
$R_{13}$ and $R_{14}$ independently of each other are $C_1$-$C_8$alkyl; and
(ii) at least one chelate ligand compound of the formula IIa, IIb or IIc

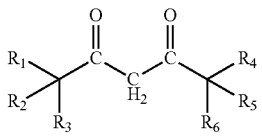
(IIa)

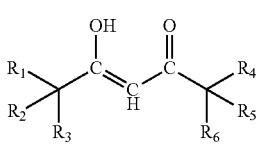
(IIb)

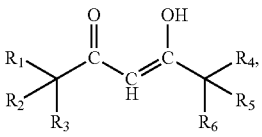
(IIc)

wherein $R_1$, $R_2$, $R_3$, $R_4$, $R_5$ and $R_6$ are defined as above for formula I.

Subject of the invention further are titanium-oxo-chelate catalyst compounds of the formula (IA) or (IB)

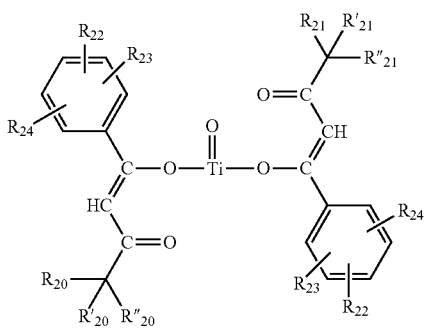
(IA)

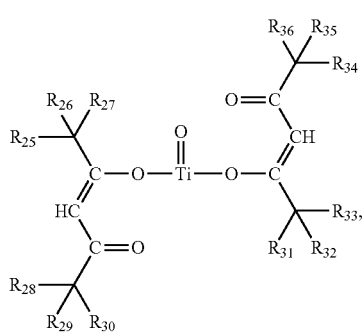
(IB)

wherein $R_{20}$, $R'_{20}$, $R''_{20}$, $R_{21}$, $R'_{21}$ and $R''_{21}$ independently of each other are hydrogen, halogen, $C_1$-$C_{20}$alkyl, which is unsubstituted or substituted by one or more $OR_{13}$ or $COOR_{13}$, or are $C_6$-$C_{14}$aryl which is unsubstituted or is substituted by one or more $C_1$-$C_8$alkyl, halogen, $OR_{13}$ or $NR_{13}R_{14}$;
provided that only one of $R_{20}$, $R'_{20}$ and $R''_{20}$ in the group

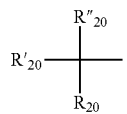

and only one of $R_{21}$, $R'_{21}$ and $R''_{21}$ in the group

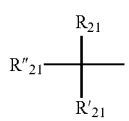

can be hydrogen;
or $R_{20}$ and $R'_{20}$ and/or $R_{21}$ and $R'_{21}$ together with the C-atom to which they are attached form a 5- to 7-membered carbocyclic ring,
$R_{22}$, $R_{23}$, $R_{24}$ independently of each other are hydrogen, halogen, $C_1$-$C_8$alkyl, $C_1$-$C_8$alkoxy, $C_6$-$C_{14}$aryl, $C_1$-$C_8$alkanoyl, $C_1$-$C_8$alkanoyloxy, $C_7$-$C_{15}$aroyl, $C_7$-$C_{15}$aroyloxy, nitrile, nitro, $C_1$-$C_8$alkylthio, $C_6$-$C_{14}$arylthio or $NR_{37}R_{38}$;
$R_{25}$, $R_{26}$, $R_{27}$, $R_{28}$, $R_{29}$, $R_{30}$, $R_{31}$, $R_{32}$, $R_{33}$, $R_{34}$, $R_{35}$ and $R_{36}$ independently of each other are hydrogen, $C_1$-$C_8$alkyl which is unsubstituted or substituted by one or more $OR_{13}$ or $COOR_{14}$, or are $C_6$-$C_{14}$aryl which is unsubstituted or is substituted by one or more $C_1$-$C_8$alkyl, $OR_{13}$ or $NR_{13}R_{14}$;
or two radicals $R_{25}$ and $R_{26}$ and/or two radicals $R_{28}$ and $R_{29}$ and/or two radicals $R_{31}$ and $R_{32}$ and/or two radicals $R_{34}$ and $R_{35}$ together with the C-atom to which they are attached form a 5- to 7-membered carbocyclic ring;
provided that only one of $R_{25}$, $R_{26}$, $R_{27}$ in the group

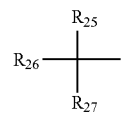

and only one of $R_{28}$, $R_{29}$, $R_{30}$ in the group

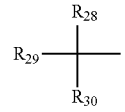

and only one of $R_{31}$, $R_{32}$, $R_{33}$ in the group

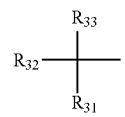

and only one of $R_{34}$, $R_{35}$, $R_{36}$ in the group

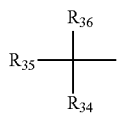

can be hydrogen; and
provided that $R_{25}$, $R_{26}$, $R_{27}$, $R_{28}$, $R_{29}$, $R_{30}$, $R_{31}$, $R_{32}$, $R_{33}$, $R_{34}$, $R_{35}$ and $R_{36}$ are not simultaneously methyl;
$R_{13}$ and $R_{14}$ independently of each other are $C_1$-$C_8$alkyl;
$R_{37}$ and $R_{38}$ independently of each other are hydrogen, $C_1$-$C_8$alkyl or $C_6$-$C_{14}$aryl, or
$R_{37}$ and $R_{38}$ together with the N-atom to which they are attached form a 5- or 6-form a 5- or 6-membered saturated or unsaturated ring, which ring optionally in addition to the N-atom comprises a further N-atom or O-atom.

The compounds of the formula IIa, IIb and IIc are tautomeric forms of the same compound. Hereinafter referred to as compound of the formula II.

$C_1$-$C_{20}$alkyl is linear or branched or cyclic and is, for example, $C_1$-$C_{18}$—, $C_1$-$C_{14}$—, $C_1$-$C_{12}$—, $C_1$-$C_8$—, $C_1$-$C_6$— or $C_1$-$C_4$alkyl. Examples are methyl, ethyl, propyl, isopropyl, n-butyl, sec-butyl, isobutyl, tert-butyl, pentyl, e.g. cyclopentyl, hexyl, e.g. cyclohexyl, heptyl, 2,4,4-trimethylpentyl, 2-ethylhexyl, octyl, nonyl, decyl, dodecyl, tetradecyl, pentadecyl, hexadecyl, octadecyl and icosyl, preferably methyl, ethyl, propyl, isopropyl, n-butyl, sec-butyl, isobutyl, tert-butyl.

$C_1$-$C_8$alkyl, $C_1$-$C_6$alkyl and $C_1$-$C_4$alkyl have the same meanings as given above for $C_1$-$C_{20}$alkyl up to the corresponding number of C-atoms.

$C_1$-$C_8$alkyl which is unsubstituted or substituted by one or more radicals is for example substituted 1-5 times, e.g. 1-4 times or once, twice or three times, $C_1$-$C_8$alkoxy is linear or branched and is for example $C_1$-$C_6$— or $C_1$-$C_4$-alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy or octyloxy, in particular methoxy, ethoxy, propoxy, isopropoxy, n-butyloxy, sec-butyloxy, iso-butyloxy, tert-butyloxy, especially methoxy.

$C_1$-$C_8$alkanoyl is linear or branched and is, for example $C_1$-$C_6$— or $C_1$-$C_4$alkanoyl or $C_4$-$C_8$alkanoyl. Examples are formyl, acetyl, propionyl, butanoyl, isobutanoyl, pentanoyl, hexanoyl, heptanoyl or octanoyl, preferably acetyl.

$C_1$-$C_8$alkanoyloxy is linear or branched, and is for example $C_2$-$C_8$—, $C_2$-$C_6$—, $C_2$-$C_4$-alkanoyloxy. Examples are acetyloxy, propionyloxy, butanoyloxy, isobutanoyloxy, preferably acetyloxy.

$C_1$-$C_8$alkylthio is $C_1$-$C_8$alkyl, which at the "yl" moiety bears a S-atom. $C_1$-$C_8$alkyl has the same meanings as given above for $C_1$-$C_{20}$alkyl up to the corresponding number of C-atoms. $C_1$-$C_8$alkylthio is linear or branched or cyclic, for example, methylthio ethylthio, propylthio, isopropylthio, n-butylthio, sec-butylthio, isobutylhtio, tert-butylthio, in particular methylthio.

$C_6$-$C_{14}$aryl is for example phenyl, naphthyl, anthryl or phenanthryl, in particular phenyl or naphthyl, preferably phenyl.

$C_6$-$C_{14}$aryl which is substituted by one or more radicals is for example substituted 1-5 times, e.g. 1-4 times or once, twice or three times. The substituents are for example bound in the 2,4,6-, 2,6-, 2,4-, 2,5-, 2,3,4-, 2-, 4- or 5-position of the phenyl ring.

$C_7$-$C_{15}$aroyl is $C_6$-$C_{14}$aryl, as defined above, which at the "yl" moiety bears a —CO— group. Examples are benzoyl, naphthoyl, phenanthroyl and anthroyl, especially benzoyl and naphthoyl, in particular benzoyl.

$C_7$-$C_{15}$aroyloxy is $C_6$-$C_{14}$aryl, as defined above, which at the "yl" moiety bears a —(CO)O— group. Examples are benzoyloxy, naphthoyloxy, phenanthroyloxy and anthroyloxy, especially benzoyloxy and naphthoyloxy, in particular benzoyloxy.

$C_6$-$C_{14}$arylthio is $C_6$-$C_{14}$aryl, which at the "yl" moiety bears a S-atom. $C_6$-$C_{14}$aryl has the same meanings as given above for $C_6$-$C_{14}$aryl. Examples are phenylthio, naphthylthio, anthrylthio, phenanthrylthio, in particular phenylthio.

Halogen is Cl, F, Br or I, for example Cl, F, Br, in particular Cl or F, especially F.

If $R_1$, $R_2$ and $R_3$ and/or $R_4$, $R_5$ and $R_6$ and/or $R_7$, $R_8$ and $R_9$ and/or $R_{10}$, $R_{11}$ and $R_{12}$ together with the C-atom to which they are attached each form a $C_6$-$C_{14}$aryl group for example groups such as

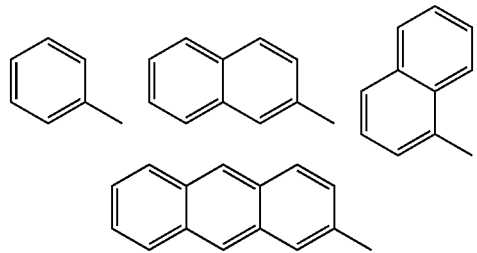

etc. are formed, wherein these groups are unsubstituted or substituted with the radicals as defined above.

If $R_1$ and $R_2$ and/or $R_4$ and $R_5$ and/or $R_7$ and $R_8$ and/or $R_{10}$ and $R_{11}$ together with the C-atom to which they are attached form a 5- to 7-membered carbocyclic ring for example groups such as

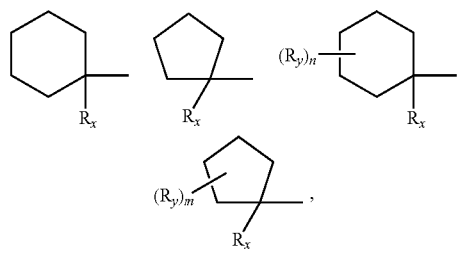

wherein $R_x$ is $R_3$, $R_6$, and/or $R_{12}$, $R_y$ is $C_1$-$C_{20}$alkyl, n is an integer 1-5 and m is an integer 1-4, etc. are formed. As the examples show, the 5-7-membered carbocyclic ring is defined to optionally include one or more alkyl substituents.

If $R_{20}$ and $R'_{20}$ and/or $R_{21}$ and $R'_{21}$ together with the C-atom to which they are attached form a 5- to 7-membered carbocyclic ring for example groups such as

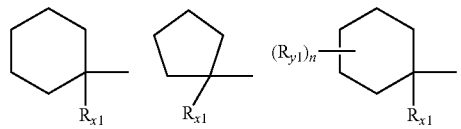

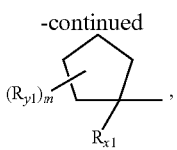

wherein $R_{x1}$ is $R''_{20}$, and/or $R''_{21}$, $R_{y1}$ is $C_1$-$C_{20}$alkyl, n is an integer 1-5 and m is an integer 1-4, etc. are formed. As the examples show, the 5-7-membered carbocyclic ring is defined to optionally include one or more alkyl substituents.

If two radicals $R_{25}$ and $R_{26}$ and/or two radicals $R_{28}$ and $R_{29}$ and/or two radicals $R_{31}$ and $R_{32}$ and/or two radicals $R_{34}$ and $R_{35}$ together with the C-atom to which they are attached form a 5- to 7-membered carbocyclic ring for example groups such as

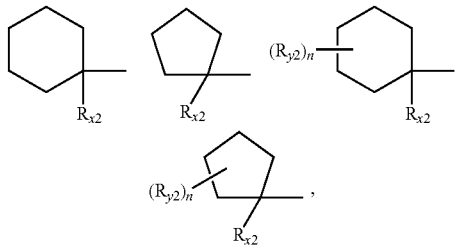

wherein $R_{x2}$ is $R_{27}$, $R_{36}$, $R_{30}$ and/or $R_{33}$, $R_{y2}$ is $C_1$-$C_{20}$alkyl, n is an integer 1-5 and m is an integer 1-4, etc. are formed. As the examples show, the 5-7-membered carbocyclic ring is defined to optionally include one or more alkyl substituents.

If $R_{37}$ and $R_{38}$ together with the N-atom to which they are attached form a 5- or 6-membered saturated or unsaturated ring, which ring optionally in addition to the N-atom comprises a further N-atom or O-atom, for example pyrrole, pyrrolidine, oxazole, pyridine, 1,3-diazine, 1,2-diazine, piperidine or morpholine rings, in particular morpholine rings, are formed.

The provisos "provided that only one of $R_1$, $R_2$ and $R_3$ in the group $R_1R_2R_3C$— and only one of $R_4$, $R_5$ and $R_6$ in the group $R_4R_5R_6C$— and only one of $R_7$, $R_8$ and $R_9$ in the group $R_7R_8R_9C$— and only one of $R_{10}$, $R_{11}$ and $R_{12}$ in the group $R_{10}R_{11}R_{12}C$— can be hydrogen;
provided that only one of $R_{20}$, $R'_{20}$ and $R''_{20}$ in the group $R_{20}R'_{20}R''_{20}C$— and only one of $R_{21}$, $R'_{21}$ and $R''_{21}$ in the group $R_{21}R'_{21}R''_{21}C$— can be hydrogen;
provided that only one of $R_{25}$, $R_{26}$, $R_{27}$ in the group $R_{25}R_{26}R_{27}C$— and only one of $R_{28}$, $R_{29}$, $R_{30}$ in the group $R_{28}R_{29}R_{30}C$— and only one of $R_{31}$, $R_{32}$, $R_{33}$ in the group $R_{31}R_{32}R_{33}C$— and only one of $R_{34}$, $R_{35}$, $R_{36}$ in the group $R_{34}R_{35}R_{36}C$— can be hydrogen" are meant to exclude compounds wherein $R_1R_2R_3C$—, $R_4R_5R_6C$—, $R_7R_8R_9C$—, $R_{20}R'_{20}R''_{20}C$—, $R_{21}R'_{21}R''_{21}C$—, $R_{25}R_{26}R_{27}C$—, $R_{28}R_{29}R_{30}C$—, $R_{31}R_{32}R_{33}C$— and $R_{34}R_{35}R_{36}C$— are —$CH_3$ or —$CH_2R_z$, wherein $R_z$ is the remaining radical $R_{25}$, $R_{26}$, $R_{27}$, $R_{28}$, $R_{29}$, $R_{30}$, $R_{31}$, $R_{32}$, $R_{33}$, $R_{34}$, $R_{35}$ or $R_{36}$.

"photolatent catalyst" refers to a compound, which upon irradiation with light, in particular with light of the wavelengths 150-800 nm, e.g. 200-800 or 200-600 nm, provides an active catalyst.

The terms "and/or" or "or/and" in the present context are meant to express that not only one of the defined alternatives (substituents) may be present, but also several of the defined alternatives (substituents) together, namely mixtures of different alternatives (substituents).

The term "at least" is meant to define one or more than one, for example one or two or three, preferably one or two.

The term "optionally substituted" means, that the radical to which it refers is either unsubstituted or substituted.

Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

The term "(meth)acrylate" in the context of the present application is meant to refer to the acrylate as well as to the corresponding methacrylate.

The preferences indicated in the text for the compounds (I), (IA), (IB) according to the present invention in the context of this invention are intended to refer to all categories of the claims, that is to the formulation, compositions, use, process claims as well.

The compounds of the formula I, IA and IB of this invention can be prepared by hydrolysis of corresponding Ti-dialkoxo chelate compounds as for example described in JP10-072475A, or by hydrolysis of corresponding Ti-dichloro chelate compounds as described for example in U.S. Pat. No. 5,767,302 (see col. 4, line 33ff).

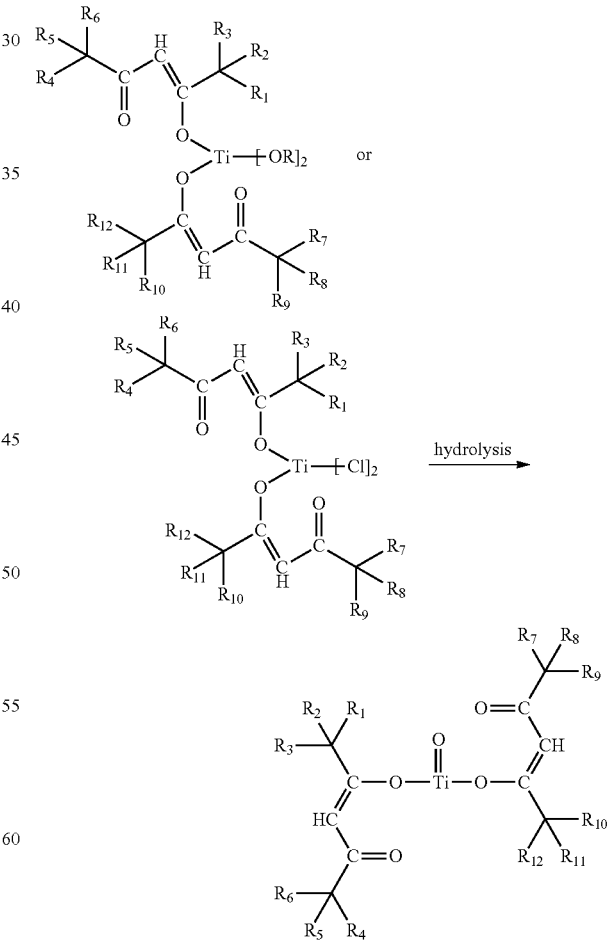

(similar with corresponding intermediates of compounds IA or IB)

The person skilled in the art is well aware of suitable methods to carry out a corresponding hydrolysis reaction. For example the hydrolysis is suitably carried out in an organic solvent such as for example an aromatic hydrocarbon, e.g. toluene etc., or an aliphatic hydrocarbon, e.g. pentane, hexane etc. As alkali chemical for example aqueous ammonia can be used.

The hydrolysis also can be performed by just adding water to a solution of the precursor compound in an organic solvent and stirring the reaction mixture, for example at moderately elevated temperatures, e.g. 50° C.

The compounds of formula II (IIa, IIb, IIc) of this invention are commercially available or can be prepared by Claisen condensation of the respective esters and methyl-ketones, a reaction well known to those skilled in the art.

The catalyst combination (that is the titanium-oxo-chelate catalyst formulation) can be for example formed using different approaches: i) dissolving a photo-latent catalyst compound of the formula I, IA or IB in a solvent or part of the formulation and adding the 1,3-diketone of the formula II to either this solution or to another part of the formulation (or in inverse order); ii) preparing the catalyst combination in advance as a physical mixture of a photo-latent catalyst compound of the formula I, IA or IB and the 1,3-diketone of the formula II which can be stored. The mixture may be prepared by mixing of the two components or by addition of the 1,3-diketone of formula II during the preparation of the chelate complex of the formula I, IA or IB.

It is clear to the person skilled in the art, that the formula I (and formula IA and IB) is a schematic drawing of the structure of a titanium-oxo chelate complex compound. Because organometallic Ti(IV) compounds have a preferred coordination number of six, such compounds are known to often exist as dimers, but they have also been found as trimers, tetramers, or even polymeric structures, all of which are meant to be included by formula I (IA and IB) of the present invention.

Structure examples (based on formula I) are:

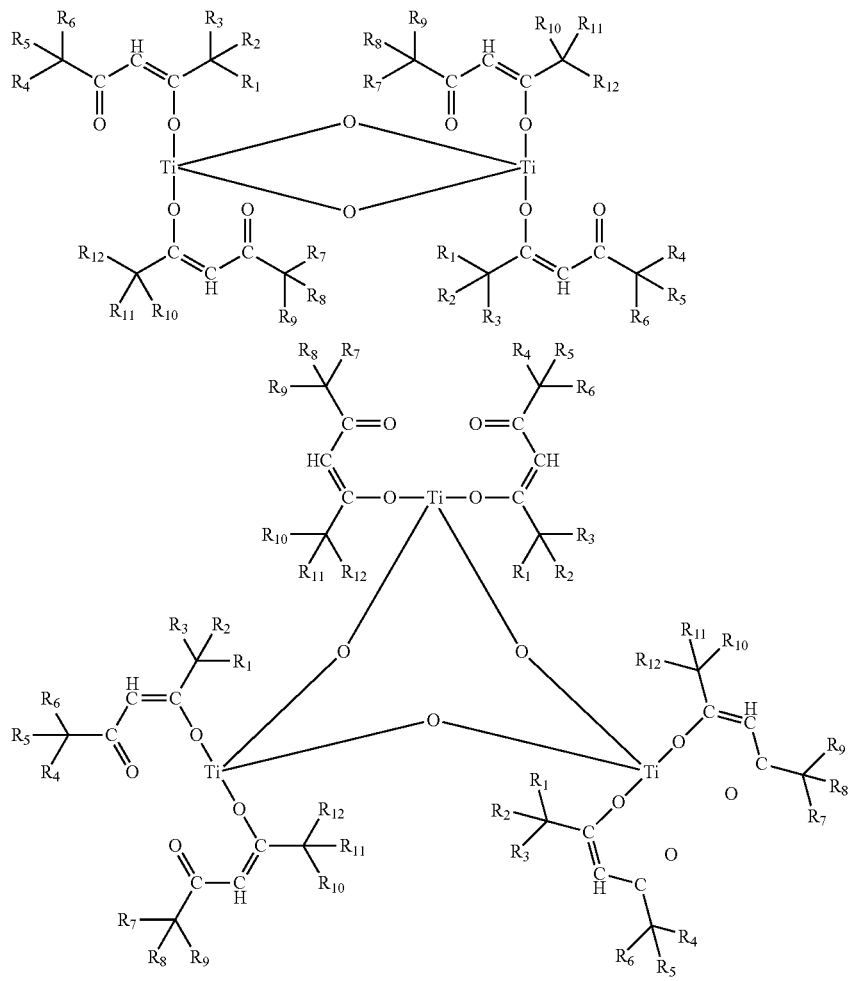

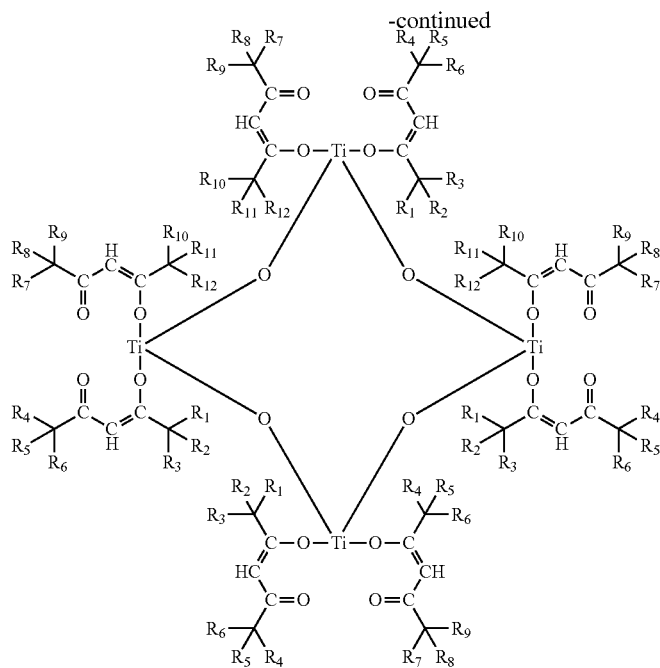

The titanium-oxo-chelate catalyst formulation as defined above for example comprises
(i) 50-99% by weight of at least one compound of the formula I as defined above, and
(ii) 1-50% by weight of at least one chelate ligand compound of the formula IIa, IIb or IIc as defined above.

Of particular interest are titanium-oxo-chelate catalyst formulations as defined above, comprising
(i) at least one compound of the formula I, wherein
$R_1$ and $R_2$ and $R_3$ together with the C-atom to which they are attached form a phenyl group which is unsubstituted or substituted by one, two or three $C_1$-$C_4$alkyl, $OR_{13}$ or $NR_{13}R_{14}$;
$R_{10}$ and $R_{11}$ and $R_{12}$ together with the C-atom to which they are attached form a phenyl group which is unsubstituted or substituted by one, two or three $C_1$-$C_4$alkyl, $OR_{13}$ or $NR_{13}R_{14}$;
$R_4$, $R_5$, $R_6$, $R_7$, $R_8$, $R_9$, independently of each other are hydrogen, halogen or $C_1$-$C_4$alkyl;
provided that only one of $R_4$, $R_5$ and $R_6$ in the group

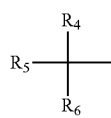

and only one of $R_7$, $R_8$ and $R_9$ in the group

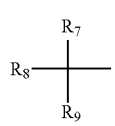

can be hydrogen;

or $R_4$, $R_5$ and $R_6$ and $R_7$, $R_8$ and $R_9$ together with the C-atom to which they are attached form a phenyl group:
or $R_4$ and $R_5$ and $R_7$ and $R_8$ together with the C-atom to which they are attached form a cyclohexyl ring;
$R_{13}$ and $R_{14}$ independently of each other are $C_1$-$C_4$alkyl;
(ii) at least one chelate ligand compound of the formula IIa, IIb or IIc

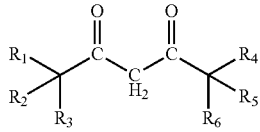 (IIa)

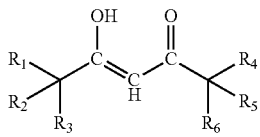 (IIb)

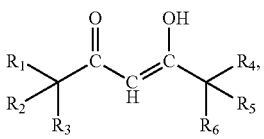 (IIc)

wherein
$R_1$, $R_2$ and $R_3$ independently of each other are hydrogen, halogen, $C_1$-$C_4$alkyl; or $R_1$ and $R_2$ and $R_3$ together with the C-atom to which they are attached form a phenyl group;
$R_4$, $R_5$ and $R_6$ independently of each other are hydrogen, halogen, $C_1$-$C_4$alkyl; or $R_4$ and $R_5$ and $R_6$ together with the C-atom to which they are attached form a phenyl group.

Interesting are compounds wherein $R_1$, $R_2$ and $R_3$ together with the C-atom to which they are attached form a $C_6$-$C_{14}$aryl group which is unsubstituted or substituted as defined above and wherein $R_{10}$, $R_{11}$ and $R_{12}$ together with the C-atom to which they are attached each form a $C_6$-$C_{14}$aryl group which is unsubstituted or substituted as defined above.

Further of interest are compounds wherein $R_7$, $R_8$, and $R_9$, are identical; and compounds wherein $R_4$, $R_5$ and $R_6$ are identical; in particular compounds, wherein $R_7$, $R_8$, $R_9$, $R_4$, $R_5$ and $R_6$ are identical.

$R_1$, $R_2$ and $R_3$ as well as $R_{10}$, $R_{11}$ and $R_{12}$ together with the corresponding C-atom to which they are attached forming a $C_6$-$C_{14}$aryl group, for example form a phenyl or naphthyl group which is unsubstituted or substituted as defined above. In particular a phenyl group is formed, which is unsubstituted or substituted by $C_1$-$C_8$alkyl, halogen, $OR_{13}$ or $NR_{13}R_{14}$. Substituents on the $C_6$-$C_{14}$aryl group, in particular the phenyl group, are for example $C_1$-$C_4$alkly, especially methyl, $OR_{13}$, where $R_{13}$ denotes $C_1$-$C_4$alkyl, especially methyl, $NR_{12}R_{13}$, wherein $R_{12}$ and $R_{13}$ are $C_1$-$C_4$alkyl, in particular methyl.

Preferred are compounds of the formula IA.

In preferred compounds the groups $R_1R_2R_3C$— and $R_{10}R_{11}R_{12}C$— are identical and/or the groups $R_4R_5R_6C$— and $R_7R_8R_9C$— are identical.

$R_{20}$, $R'_{20}$, $R''_{20}$ for example independently of each other are hydrogen, halogen or $C_1$-$C_{20}$alkyl, which is unsubstituted or substituted by one or more $OR_{13}$ or $COOR_{13}$; or $R_{20}$, $R'_{20}$, $R''_{20}$ for example independently of each other are hydrogen, halogen or $C_1$-$C_8$alkyl; or $R_{20}$, $R'_{20}$, $R''_{20}$ for example independently of each other are hydrogen, fluoro or $C_1$-$C_8$alkyl, in particular $R_{20}$, $R'_{20}$, $R''_{20}$ are hydrogen, fluoro or methyl.

$R_{21}$, $R'_{21}$, $R''_{21}$ for example independently of each other hydrogen, halogen or $C_1$-$C_{20}$alkyl, which is unsubstituted or substituted by one or more $OR_{13}$ or $COOR_{13}$; or $R_{21}$, $R'_{21}$, $R''_{21}$ for example independently of each other are hydrogen, halogen or $C_1$-$C_8$alkyl; or $R_{21}$, $R'_{21}$, $R''_{21}$ for example independently of each other are hydrogen, fluoro or $C_1$-$C_8$alkyl, in particular $R_{21}$, $R'_{21}$, $R''_{21}$ are hydrogen, fluoro or methyl.

Preferably the groups $R_{20}$, $R'_{20}R''_{20}C$— and $R_{21}R'_{21}R''_{21}C$— are identical.

$R_{22}$, $R_{23}$, $R_{24}$ for example independently of each other are hydrogen, $C_1$-$C_8$alkyl, $C_1$-$C_8$alkoxy, $C_1$-$C_8$alkanoyl, $C_1$-$C_8$alkanoyloxy, chloro, nitrile, nitro, $C_1$-$C_8$alkylthio, $C_6$-$C_{14}$arylthio or $NR_{37}R_{38}$; or $R_{22}$, $R_{23}$, $R_{24}$ for example independently of each other are hydrogen, $C_1$-$C_8$alkyl, $C_1$-$C_8$alkoxy, $C_1$-$C_8$alkanoyl, $C_1$-$C_8$alkanoyloxy or $NR_{37}R_{38}$; or $R_{22}$, $R_{23}$, $R_{24}$ for example independently of each other are hydrogen, $C_1$-$C_8$alkyl, $C_1$-$C_8$alkoxy, or $NR_{37}R_{38}$; in particular $R_{22}$, $R_{23}$, $R_{24}$ for example independently of each other are hydrogen, methyl, methoxy or dimethylamino.

$R_{25}$, $R_{26}$, $R_{27}$ for example independently of each other are hydrogen, $C_1$-$C_8$alkyl which is unsubstituted or substituted by one or more $OR_{13}$ or $COOR_{14}$, or two radicals $R_{25}$ and $R_{26}$ together with the C-atom to which they are attached form a cyclopentyl or cyclohexyl ring; or $R_{25}$, $R_{26}$, $R_{27}$ for example independently of each other are hydrogen, $C_1$-$C_8$alkyl, or two radicals $R_{25}$ and $R_{26}$ together with the C-atom to which they are attached form a cyclopentyl or cyclohexyl ring; or $R_{25}$, $R_{26}$, $R_{27}$ for example independently of each other are hydrogen, $C_1$-$C_8$alkyl which is unsubstituted or substituted by one or more $OR_{13}$ or $COOR_{14}$; or $R_{25}$, $R_{26}$, $R_{27}$ for example independently of each other are hydrogen or $C_1$-$C_8$alkyl.

$R_{31}$, $R_{32}$, $R_{33}$ for example independently of each other are hydrogen, $C_1$-$C_8$alkyl which is unsubstituted or substituted by one or more $OR_{13}$ or $COOR_{14}$, or two radicals $R_{31}$ and $R_{32}$ together with the C-atom to which they are attached form a cyclopentyl or cyclohexyl ring; or $R_{31}$, $R_{32}$, $R_{33}$ for example independently of each other are hydrogen, $C_1$-$C_8$alkyl, or two radicals $R_{31}$ and $R_{32}$ together with the C-atom to which they are attached form a cyclopentyl or cyclohexyl ring; or $R_{31}$, $R_{32}$, $R_{33}$ for example independently of each other are hydrogen, $C_1$-$C_8$alkyl which is unsubstituted or substituted by one or more $OR_{13}$ or $COOR_{14}$; or $R_{31}$, $R_{32}$, $R_{33}$ for example independently of each other are hydrogen or $C_1$-$C_8$alkyl.

$R_{28}$, $R_{29}$, $R_{30}$ for example independently of each other are hydrogen, $C_1$-$C_8$alkyl which is unsubstituted or substituted by one or more $OR_{13}$ or $COOR_{14}$, or two radicals $R_{28}$ and $R_{29}$ together with the C-atom to which they are attached form a cyclopentyl or cyclohexyl ring; or $R_{28}$, $R_{29}$, $R_{30}$ for example independently of each other are hydrogen, $C_1$-$C_8$alkyl, or two radicals $R_{28}$ and $R_{29}$ together with the C-atom to which they are attached form a cyclopentyl or cyclohexyl ring; or $R_{28}$, $R_{29}$, $R_{30}$ for example independently of each other are hydrogen, $C_1$-$C_8$alkyl which is unsubstituted or substituted by one or more $OR_{13}$ or $COOR_{14}$; or $R_{28}$, $R_{29}$, $R_{30}$ for example independently of each other are hydrogen or $C_1$-$C_8$alkyl.

$R_{34}$, $R_{35}$, $R_{36}$ for example independently of each other are hydrogen, $C_1$-$C_8$alkyl which is unsubstituted or substituted by one or more $OR_{13}$ or $COOR_{14}$, or two radicals $R_{34}$ and $R_{35}$ together with the C-atom to which they are attached form a cyclopentyl or cyclohexyl ring; or $R_{34}$, $R_{35}$, $R_{36}$ for example independently of each other are hydrogen, $C_r$-$C_8$alkyl, or two radicals $R_{34}$ and $R_{35}$ together with the C-atom to which they are attached form a cyclopentyl or cyclohexyl ring; or $R_{34}$, $R_{35}$, $R_{36}$ for example independently of each other are hydrogen, $C_1$-$C_8$alkyl which is unsubstituted or substituted by one or more $OR_{13}$ or $COOR_{14}$; or $R_{34}$, $R_{35}$, $R_{36}$ for example independently of each other are hydrogen or $C_1$-$C_8$alkyl.

In preferred compounds the groups $R_{25}R_{26}R_{27}C$— and $R_{31}R_{32}R_{33}C$— are identical and/or the groups $R_{28}R_{29}R_{30}C$— and $R_{34}R_{35}R_{36}C$— are identical.

Interesting further are compounds of the following formula IB'

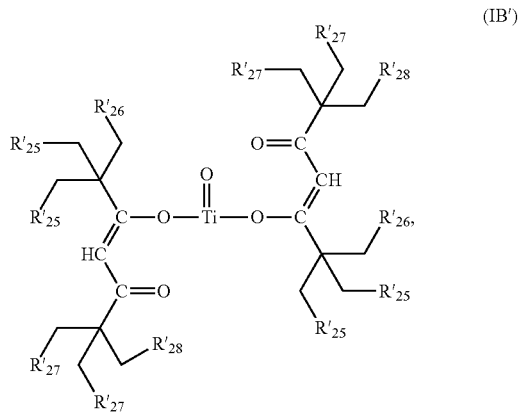

(IB')

wherein
$R'_{25}$, $R'_{26}$, $R'_{27}$ and $R'_{28}$ independently of each other are hydrogen, $C_1$-$C_8$alkyl which is unsubstituted or substituted by one or more $OR_{13}$ or $COOR_{14}$, or are $C_6$-$C_{14}$aryl which is unsubstituted or is substituted by one or more $C_1$-$C_8$alkyl, $OR_{13}$ or $NR_{13}R_{14}$;

or two radicals $R'_{25}$ and $R'_{26}$ together with the C-atom to which they are attached and/or or two radicals $R'_{27}$ and $R'_{28}$ together with the C-atom to which they are attached form a 5- to 7-membered carbocyclic ring.

In particular preferred are the compounds as given hereinafter in the examples.

This invention provides (photo)latent compounds as catalysts for polyaddition or polycondensation reactions, that are catalysed by Lewis-acid type reactants. Especially preferred is the reaction of polyols with isocyanates.

The compounds of the formula (I) as defined above, as well as the catalyst formulation as defined above can be used as photolatent compounds, e.g. in processes which are initialized by exposing the formulation to be crosslinked to electromagnetic radiation of wavelengths in the range of 200-800 nm, in particular the compounds of the formula (I) can be used as photolatent compounds.

Especially suitable as photolatent compound is catalyst 12 (see examples).

Accordingly, subject of the invention also is the use the Ti-oxo-chelate catalyst formulation as described above as a catalyst for polyaddition or polycondensation reactions, that are catalysed by Lewis-acid type reactants, in particular for the crosslinking of a blocked or unblocked isocyanate or isothiocyanate component with a polyol to form a polyurethane (PU).

Another subject is the use of a Ti-oxo-chelate catalyst compound of the formula (I) as defined above as a catalyst for polyaddition or polycondensation reactions, that are catalysed by Lewis-acid type reactants, in particular for the crosslinking of a blocked or unblocked isocyanate or isothiocyanate component with a polyol to form a polyurethane (PU).

Subject of the invention also is the use of a Ti-oxo-chelate catalyst compound of the formula (I) as defined above, wherein at least one of $R_1$, $R_2$, $R_3$, $R_4$, $R_5$, $R_6$, $R_7$, $R_8$, $R_9$, $R_{10}$, $R_{11}$ or $R_{12}$ is not methyl, as a catalyst for polyaddition or polycondensation reactions, that are catalysed by Lewis-acid type reactants, in particular for the crosslinking of a blocked or unblocked isocyanate or isothiocyanate component with a polyol to form a polyurethane (PU).

Preferred is the use of the Ti-oxo-chelate catalyst formulation as described above.

Subject of the invention further is a polymerizable composition comprising
(a) at least one component which is capable of a polyaddition or polycondensation reaction in the presence of a Lewis-acid type reactant; and
(b) a Ti-oxo-chelate catalyst formulation as described above; as well as a polymerizable composition comprising as component (a)
(a1) at least one blocked or unblocked isocyanate or isothiocyanate component, and
(a2) at least one polyol.

Another subject of the invention further is a polymerizable composition comprising
(a) at least one component which is capable of a polyaddition or polycondensation reaction in the presence of a Lewis-acid type reactant; and
(b) at least one Ti-oxo-chelate catalyst compound of the formula (I) as described above;
as well as a polymerizable composition comprising as component (a)
(a1) at least one blocked or unblocked isocyanate or isothiocyanate component, and
(a2) at least one polyol.

Further subject of the invention is a polymerizable composition comprising
(a) at least one component which is capable of a polyaddition or polycondensation reaction in the presence of a Lewis-acid type reactant; and
(b) at least one Ti-oxo-chelate catalyst compound of the formula (I) as described above wherein at least one of $R_1$, $R_2$, $R_3$, $R_4$, $R_5$, $R_6$, $R_7$, $R_8$, $R_9$, $R_{10}$, $R_{11}$ or $R_{12}$ is not methyl; as well as a polymerizable composition comprising as component (a)
(a1) at least one blocked or unblocked isocyanate or isothiocyanate component, and
(a2) at least one polyol.

Said polymerizable composition in addition to components (a) and (b) can comprise further additives (d), in particular a photosensitizer compound.

The photopolymerizable compositions generally comprise 0.001 to 15% by weight, e.g. 0.05 to 15% by weight, preferably 0.01 to 5% by weight, most preferably 0.05 to 2.5%, of the Ti-oxo-chelate catalyst compound of the formula I, based on the total composition. In other words, the amount as defined above refers to the active catalyst compound, excluding the compounds of the formula IIa, IIb and IIc which are present in the Ti-oxo-chelate catalyst formulation as defined above. The amounts are based on the total weight of the composition.

The catalyst compounds and formulations of the invention can for example be used for crosslinking of moisture curing silicone elastomers. The use of a Ti chelate catalyst compound for crosslinking of moisture curing silicone elastomers is e.g. described by J. -M. Pujol and C. Prébet in J. Adhesion Sci. Technol. 2003, 17, 261. Curing by crosslinking of silicone compositions is used in many applications such as waterproofing seals in construction (G. M. Lucas in WO02/062893 or T. Detemmerman et al in WO2008/045395), adhesives in structural glazing, gaskets in car engines, adhesives for electronic devices, and antifouling or moisture repellent coatings (H. Kobayashi et al in WO02/098983). Ti chelates can also be used for room-temperature curable organopolysiloxane compositions used e.g. as sealants or coating agents for electric circuits and electrodes (A. Nabeta et al in WO2009/054279), for curing of pressure sensitive adhesives as described by K. Fujimoto and K. Ueda in EP1715015, or for curing of an adhesive composition based on silane and phenolic resin (S. Sano et al in EP1842889). They can also be used for curing of non silicone rubber compositions as described e.g. by T. W. Wilson in WO02/100937. Ti chelate catalysts can also be used for curing of epoxy resins (W. J. Blank et al in Journal of Coatings Technology 2002, 74, 33), e.g. for anhydride epoxy resins as described by J. D. B. Smith in J. Applied Polym. Sci. 1981, 26, 979, or carboxyl epoxy resins used for heat activatable adhesive tapes (T. Krawinkel in WO2008/043660).

Other examples of metal catalyzed crosslinking reactions are for example the reaction of siloxane-terminated oligomers with epoxides used in the fabrication of abrasion and weather resistant coatings (M. Priesch in DE19935471), the reaction of epoxy resins with hydroxyl-terminated poly (dimethyloxysilanes) and an aminopropyltriethoxysilane crosslinker (M. Alagar et al. Eur. Polym. J. 2000, 36, 2449), or the reaction of polyethers terminated by hydrolysable silyl groups with epoxy silanes and ketimines (Y. Murayama, JP06049346) or oximo-ethoxy functional sealants as described by H. M. Haugsby et al in EP399682. The use of room temperature vulcanizing (RTV) siloxane rubbers for biofouling protection is reported by J. M. Delehanty et al, GB2444255. Sol-gel reactions catalysed by a metal catalyst are for example described by J. Mendez-Vivar, J. of Sol-Gel Sci. Technol. 2006, 38(2), 159.

Another subject of the invention is a process for polymerizing compounds, which are capable to crosslink in the presence of a Lewis acid, characterized in that a catalyst formulation according to the invention is added to said compounds and the resulting mixture is irradiated with electromagnetic radiation of a wavelength range of 200-800 nm; in particular a process wherein the component which is capable to crosslink in the presence of a Lewis acid is a mixture of (a) a blocked or unblocked isocyanate or isothiocyanate component and (b) a polyol.

Interesting further is a process as described above, characterized in that instead of irradiating with electromagnetic radiation the mixture is subjected to a heat treatment, or the mixture is irradiated with electromagnetic radiation and simultaneously with or after the irradiation subjected to a heat treatment.

Further subjects of the invention are a process as described above for the preparation of adhesives, coatings, sealings, potting components, printing inks, printing plates, foams, moulding compounds, or photostructured layers, as well as the use of the polymerizable composition as described above for the preparation of adhesives, coatings, sealings, potting components, printing inks, printing plates, foams, moulding compounds, or photostructured layers.

Another subject is a coated substrate coated on at least one surface with a composition as described above and a polymerized or crosslinked composition as described above.

Polyols (component (a2)) are generally defined as polymeric or oligomeric organic species with at least two hydroxy functionalities.

Examples of suitable polyols include trimethylol propane, trimethylol ethane, glycerol, 1,2,6-hexanetriol, ethylene glycol, 1,2-propylene glycol, 1,3-propylene glycol, 2-methyl-propane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, etc., and mixtures thereof. Suitable polyols also include the more recently developed hyperbranched OH-polymers.

The hydroxyl-functional compound comprising at least two hydroxyl-functional groups may for example also be selected from polyester polyols, polyether polyols, e.g. poly-THF-poylol, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, e.g. HO-functional vinyl oligomers, such as castor oil and trimethylol propane, may be included. Interesting polyols are acrylic and polyester polyols, e.g. the Joncryl® acrylic polyols available from BASF (e.g. Joncryl® 512 or 922), or Setalux® and Setal® products available from Nuplex Resins (e.g. Setalux® 1187 XX-60, Setal® 1606 BA-80), or Desmophen® products from Bayer Material Science (e.g. Desmophen® A HS 1170 BA).

In the context of the present invention also polyol components which are suitable in water-borne system such as e.g. waterborne 2K polyurethane, can be employed. Such polyol components are commercially available, for example from BASF under the trademark Joncryl®, e.g. Joncryl®8311 and also the trademark Luhydran®, e.g. Luhydran®5938T as well as from Bayer Material Science under the trademark BAYHYDROL®, eg. BAYHYDROL® XP2470.

Suitable isocyanate components (a1) are for example isocyanates—with functional groups capable of reacting with hydroxyl—and are structured as follows:

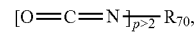

wherein $R_{70}$ is a hydrocarbyl structure.

The organic (poly)isocyanate includes for example polyfunctional, preferably free poly-isocyanates, with, for instance, an average NCO functionality of 2.5 to 5, and may be aliphatic, cycloaliphatic, araliphatic or aromatic in nature. Examples are di-, tri- or tetra-isocyanates. The polyisocyanate may include biuret, urethane, uretdione, and isocyanurate derivatives. Suitable polyisocyanates include polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanates, etc.

Examples of these organic polyisocyanates include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl)methane, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylen diisocyanate, 1,4-xylylen diisocyanate, 1-isocyanato-3-(isocyanato methyl)-1-methyl cyclohexane, m-α,α-α',α'-tetramethyl xylylene diisocyanate, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega,omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane-4,4'-diisocyanate, a toluene diisocyanate, 1,3-bis(1-isocyanato-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, the above-mentioned derivatives thereof, and mixtures thereof. Further examples are polyisocyanates having isocyanurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (e.g. as available under the trademark Desmodur®N from Bayer Corporation), the adduct of 1 molecule of trimethylol propane and 3 molecules of toluene diisocyanate (available under the trademark Desmodur®L from Bayer Corporation), the adduct of 1 molecule of trimethylol propane and 3 molecules of isophorone diisocyanate, compounds such as 1,3,5-triisocyanatobenzene and 2,4,6-triisocyanatotoluene, and the adduct of 1 molecule of pentaerythritol and 4 molecules of toluene diisocyanate.

A specific example of an isocyanate capable of reacting with hydroxyl groups is the HDI trimer, e.g. Desmodur® 3300 available from Bayer, or Basonat® HI 100 available from BASF. The idealized structure of the latter is given as follows (also, pentamer, heptamer and higher molecular weight species can be present):

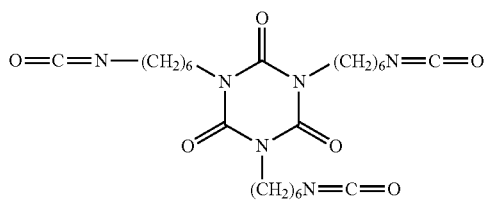

Normally, these products are liquid at ambient temperature and commercially available in a wide range. Particularly preferred isocyanate curing agents are triisocyanates and adducts. Examples thereof are 1,8-diisocyanato-4-(isocyanatomethyl)octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-α,α-α',α'-tetramethyl xylene diisocyanate to 1 mole of trimethylol propane, and mixtures thereof.

In particular interesting are cyclic trimers (isocyanurates) and uretdiones of 1,6-hexane diisocyanate and isophorone diisocyanate. Usually these compounds contain small quantities of their higher homologues.

Optionally, in case the present composition is used as a water borne coating composition, it may also comprise an organic hydrophilic polyisocyanate compound substituted with non-ionic groups, such as $C_1$-$C_4$ alkoxy polyalkylene oxide groups. For example 30 wt. % of non-ionic groups will be present on the total solid polyisocyanate compound, e.g. 20 wt. %, preferably 15 wt. %. Ionically stabilized polyisocyanates may also be used.

In any of the compositions herein, the polymeric materials may range from relatively low to relatively high molecular weight. It is preferred that they be of relatively low molecular weight so as to keep the viscosity of the compositions before crosslinking low, so as to avoid or minimize the need for solvent(s).

As the isocyanate to be crosslinked with the latent catalyst formulation of the present invention also blocked isocyanates may be used. Said compounds are for example "deblocked" prior to the use in the composition, or may be deblocked during the reaction, or may take part in the reaction in the blocked form, e.g. in the course of the "activation" of the latent catalyst by heat or irradiation.

Blocked isocyanates are known in the art and for example described in a review article by D. A. Wicks, Z. W. Wicks in *Progress in Organic Coatings*, 41 (2001), 1-83, as well as by C. Gürtler, M. Homann, M. Mager, M. Schelhaas, T. Stingl, Farbe+Lack 2004, 110(12), 34; both documents incorporated herein by reference.

Suitable isocyanate components are for example as given above.

Suitable blocking agents for the isocyanates are the ones known in the art, for example alcohols, phenols, amines, imides, amides, guanidines, amidines, triazoles, pyrazoles, active methylene compounds, ketoximes, oximes, malonesters, alkylacetoacetates, formiates, lactams, imidazoles, triazoles, pyrazoles, CH-acidic cyclic ketones and mercaptans.

Examples are aliphatic, cycloaliphatic, aromatic, or alkyl monoalcohol or phenolic compounds such as, for example, lower aliphatic alcohols including methyl, ethyl, chloroethyl, propyl, butyl, amyl, hexyl, heptyl, octyl, nonyl, decyl and lauryl alcohols, 3,3,5-trimethylhexanol and the like. The aromatic-alkyl alcohols include for example phenylcarbinol and ethylphenylcarbinol. Glycol ethers may be employed such as ethyl glycol monoethyl ether, ethyl glycol monobutyl ether and equivalents thereof. Examples of phenolic compounds which may be employed comprise phenol, substituted phenols such as cresol, xylenol, nitrophenol, chlorophenol, ethyl phenol, t-butyl phenol and 2,5-di-t-butyl-4-hydroxy toluene.

Examples of other blocking agents that may be employed include tertiary hydroxyl amines such as diethylethanolamin, lactams such as caprolactam and oximes such as methyl ethyl ketone oxime, acetone oxime and cyclohexanone oxime.

Specific examples are butanonoxime, diisoproylamine, 1,2,4-triazole, dimethyl-1,2,4-triazole, imidazole, ethylates of malonic and acetic acid, acetoneoxime, 3,5-dimethylpyrazole, epsilon-caprolactame, N-methyl-, N-ethyl, N-(iso)propyl, N-n-butyl, N-iso-butyl-, N-tert.-butylbenzylamine or, 1,1-dimethylbenzylamine, N-alkyl-N-1,1-dimethylmethylphenylamine; adducts of benzylamine and compounds with activated double bonds, such as malonic acid esters, N,N-dimethylaminopropylbenzylamine and other compounds comprising tertiary amine groups, where appropriate substituted benzylamines and/or dibenzylamine.

Use of the oximes and phenols in some instances is desirable because some specific polyisocyanates blocked with these oximes or phenols uncap at relatively low temperatures.

Examples of suitable CH-acidic ketones are given in WO 04/058849 and incorporated herein by reference. Preferred are cyclopentanon-2-carboxymethylester, cyclopentanon-2-carboxyethylester, cyclopentanon-2-carboxynitrile, cyclohexanon-2-carboxymethylester, cyclohexanon-2-carboxyethylester, cyclopentanon-2-carbonylmethane, especially cyclopentanon-2-carboxymethylester, cyclopentanon-2-carboxyethylester, cyclohexanon-2-carboxymethylester and cyclohexanon-2-carboxyethylester, in particular cyclopentanon-2-carboxyethylester and cyclohexanon-2-carboxyethylester.

It is evident that also mixtures of different blocking agents may be used and a blocked isocyanate which may be employed in the presently claimed composition may have different blocking groups.

The compositions contain the blocked isocyanate in an amount, for example, of from 5 to 95% by weight, preferably from 20 to 80% by weight, based on the total composition. The ratio isocyanate to polyol for example varies from about 2:1 to 1:2, preferably from 1.2:1 to 1:1.2. The molecular weight MW of the blocked isocyanate for example ranges from about 100 to 50000, especially from 200 to 20000.

Other additives (d), which may optionally be present in the compositions include one or more solvents (and are meant to act only as solvents). These preferably do not contain groups such as hydroxyl or primary or secondary amino.

Depending on use, the compositions may contain other materials (d). Examples of ingredients, additives or auxiliaries (d), are pigments, dyes, emulsifiers (surfactants), pigment dispersion aids, levelling agents, anti-cratering agents, antifoaming agents, wetting agents, antisagging agents, heat stabilisers, UV absorbers, antioxidants, desiccants and fillers.

For example, especially when used as encapsulants and sealants, the compositions may contain fillers, pigments, and/or antioxidants.

When used as coatings, the present compositions optionally contain typically added ingredients known in the art, which are described below. For example there may be other polymers (e) (especially of low molecular weight, "functionalized oligomers") which are either inert or have a functional group other than hydroxyl or isocyanate and also react with other reactive materials in the coating composition.

Representative examples of such functionalized oligomers that can be employed as components or potential crosslinking agents of the coatings are the following:

Hydroxyl oligomers: for example the reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like produce acid oligomers. These acid oligomers are further reacted with monofunctional epoxies such as butylene oxide, propylene oxide, and the like to form hydroxyl oligomers.

Silane oligomers: for example the above hydroxyl oligomers further reacted with isocyanato propyltrimethoxy silane.

Epoxy oligomers: for example the diglycidyl ester of cyclohexane dicarboxylic acid, such as for example Araldite®CY-184 from Huntsman, and cycloaliphatic epoxies, such as for example Celloxide 2021 and the like from Daicel, or for example hydroxyl-terminated epoxidized polybutadiene, e.g. Poly bd 600 and 605 from Sartomer. Also suitable as reactive materials are for example oxetane derivatives, e.g. OXT 101 and 121 from Toagosei or TMPO from Perstorp.

Aldimine oligomers: for example the reaction product of isobutyraldehyde with diamines such as isophorone diamine, and the like.

Ketimine oligomers: for example the reaction product of methyl isobutyl ketone with diamines such as isophorone diamine.

Melamine oligomers: for example the commercially available melamines such as CYMEL® 1168 from Cytec Industries, and the like.

AB-functionalized oligomers: for example acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-functionalized crosslinkers: for example epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

Preferred functionalized oligomers have for example a weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25.

Other additives for example also include polyaspartic esters, which are the reaction product of diamines, such as, isophorone diamine with dialkyl maleates, such as, diethyl maleate.

Optionally, a hydroxyl-functional compound comprising at least two hydroxyl-functional groups may be present in the curable material. The hydroxyl-functional compound comprising at least two hydroxyl-functional groups may for example be selected from polyester polyols, polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be included. Interesting polyols are acrylate polyols, e.g. the acrylate polyol Setalux®1187 available from Nuplex Resins.

Coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate and the like.

The compositions of this invention may additionally contain a binder (f) of a noncyclic oligomer, i.e., one that is linear or aromatic. Such noncyclic oligomers can include, for instance, succinic anhydride- or phthalic anhydride-derived moieties in hydroxyl oligomers and the like.

The compositions of the invention as coating compositions can for example also contain as a binder an acrylic polymer of a weight average molecular weight greater than 3,000, or a conventional polyester such as SCD®-1040 from Etna Product Inc. for improved appearance, sag resistance, flow and leveling and the like. The acrylic polymer is for example composed of typical monomers such as acrylates, methacrylates, styrene and the like and functional monomers such as hydroxy ethyl acrylate, glycidyl methacrylate, or gamma-methacrylylpropyl trimethoxysilane and the like.

The coating compositions for example can also contain a binder (f) of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 µm. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is for example comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

Optionally, for example a ketone based chelating agent (as further additive (d)) may be added to the coating composition. Examples of these chelating agents include alphahydroxyl ketones, fused aromatic beta-hydroxy ketones, dialkyl malonates, aceto acetic esters, alkyl lactates, and alkyl pyruvates. The ketone based chelating agent for example is used in an amount up to 10 wt. % on solids, preferably up to 5 wt. %.

In one embodiment the coating composition additionally comprises a pot life extending agent. A pot life extending agent is particularly beneficial when the photolatent catalyst exhibits a certain degree of catalytic activity also in the latent form. It may also be the case that the photolatent catalyst contains catalytically active impurities which deteriorate the pot life of the composition. Pot life extending agents increase the pot life of the coating composition, i.e. the time between the mixing of all components and the moment when the viscosity becomes too high for the composition to be applied. Pot life extending agents can suitably be present in similar amounts as the photo-latent catalysts mentioned above. Preferred pot life extending agents have only a limited or no negative impact on the drying speed of the coating composition, in particular when curing the applied coating at elevated temperature, such as 40 to 60° C. Thus, these pot life extending agents improve the balance of pot life and drying speed. The pot life extending agent can also have a beneficial effect on the appearance of the coating. Examples of suitable pot life extending agents are carboxylic acid group-containing compounds, such as acetic acid, propionic acid or pentanoic acid. Aromatic carboxylic acid group-containing compounds are preferred, in particular benzoic acid. Other suitable pot life extending agents are phenolic compounds, tertiary alcohols such as tertiary butanol and tertiary amyl alcohol, and thiol group-containing compounds. It is also possible to use a combination of the above-mentioned pot life extending agents, such as a combination of an aromatic carboxylic acid group-containing compound and a thiol group-containing compound or a mercapto carboxylic acid.

The composition according to the present invention may be a water-borne composition, a solvent borne composition or a solvent-free composition. Since the composition may be composed of liquid oligomers, it is especially suitable for use as a high solids composition or a solvent-free composition. Alternatively, the coating composition of the present invention is an aqueous powder coating dispersion wherein the isocyanate reactive compound has a Tg above 20° C. The coating composition may as well be used in powder coating compositions and hot melt coatings compositions. For example the theoretical volatile organic content (VOC) in the composition is less than about 450 g/l, e.g. less than about 350 g/l, or less than about 250 g/l.

The compositions of the invention, in particular as coating compositions, can for example also contain conventional additives (d) such as pigments, stabilizers, rheology control agents, flow agents, toughening agents and fillers. Such additional additives will, of course, depend on the intended use of the (coating) composition.

The compositions according to the invention are typically applied to a substrate by conventional techniques such as spraying, electrostatic spraying, roller coating, curtain coating, dipping or brushing. The present formulations are for example useful as a clear coating for outdoor articles, such as automobile and other vehicle body parts. The substrate optionally is for example prepared with a primer and or a color coat or other surface preparation prior to coating with the present compositions.

A layer of a coating composition is for example cured under ambient conditions in the range of a few minutes to 24 hours, for example 5 minutes to 3 h, preferably in the range of 30 minutes to 8 hours (depending on the type of radiation source), after activating the latent catalyst e.g. by exposure to radiation, to form a coating on the substrate having the desired coating properties. One of skill in the art appreciates that the actual curing time depends upon several parameters, including thickness, latent catalyst concentration, ingredients in the formulation; and it depends also upon any additional mechanical aids, such as, for example fans that assist in continuously flowing air over the coated substrate to accelerate the cure rate. If desired, the cure rate may be further accelerated by heating the coated substrate at temperatures generally in the range of from about 60° C. to 150° C. for a period of for example about 15 to 90 minutes. The heating is for example performed by heating in an oven, by subjecting the samples to hot air, by IR-exposure, by microwaves or any other suitable means known in the art. The foregoing heating step is particularly useful under OEM (Original Equipment Manufacture) conditions. The cure time may also depend on other parameters such as for example the humidity of the atmosphere.

The latent catalyst compounds and formulations of this invention can for example be used for coating applications and generally in areas where curing of polyurethane is required. For example, the compositions are suitable as clear or pigmented coatings in industrial and maintenance coating applications.

Additives (d) are for example additional coinitiators or sensitizers which shift or broaden the spectral sensitivity. In general these are aromatic carbonyl compounds, for example benzophenone, thioxanthone, anthraquinone and 3-acylcoumarin derivatives or dyes such as eosine, rhodamine and erythrosine dyes which improve the overall quantum yield by means, for example, of energy transfer or electron transfer. Examples of suitable dyes which can be added as coinitiators are triarylmethanes, for example malachite green, indolines, thiazines, for example methylene blue, xanthones, thioxanthones, oxazines, acridines or phenazines, for example safranine, and rhodamines of the formula

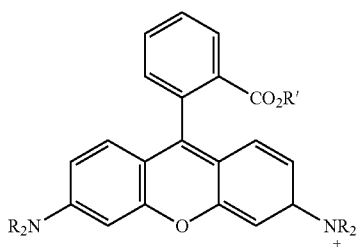

in which R is alkyl or aryl and R' is hydrogen or an alkyl or aryl radical, for example Rhodamine B, Rhodamine 6G or Violamine R, and also Sulforhodamine B or Sulforhodamine G. Likewise suitable are fluorones such as, for example, 5,7-diiodo-3-butoxy-6-fluorone.

Further specific examples of photosensitizers suitable as component (d) are 3-(aroylmethylene)-thiazoline and 3-(aroylmethylene)-thiazoline derivatives and rhodanine derivatives.

Specific exampes of suitable sensitizers are known to the person skilled in the art and are for example published in WO 06/008251, page 36, line 30 to page 38, line 8, the disclosure of which is hereby incorporated by reference.

Particular preference is given to unsubstituted and substituted benzophenones or thioxanthones. Examples of suitable benzophenones are benzophenone, 4,4'-bis(dimethylamino)benzophenone, 4,4'-bis(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyldiphenyl sulfide, 4-methoxy-3,3'-methylbenzophenone, isopropylthioxanthone, chlorothioxanthone, 1-chloro-4-propoxythioxanthone, 2,4-dimethylthioxanthone, 2,4-diethylthioxanthone, 1,3-dimethyl-2-(2-ethylhexyloxy) thioxanthone.

Likewise preferred are mixtures of benzophenones and/or thioxanthones such as, for example, a mixture of benzophenone and 4-methylbenzophenone or of 4-methylbenzophenone and 2,4,6-trimethylbenzophenone.

Within the scope of the present invention also radical-generating photoinitiators, such as hydroxyl ketones, amino ketones, monacyl phosphine oxides, bisacylphosphine oxides and oxime esters can be employed as sensitizers.

Further customary additives (d), depending on the intended use, are optical brighteners, fillers, pigments, dyes, wetting agents, levelling assistants, antistatics, flow improvers and adhesion promoters, antioxidants, desiccants, light stabilizers, e.g. UVabsorbers, for example those of the hydroxybenzotriazole, hydroxyphenylbenzophenone, oxalamide or hydroxyphenyl-s-triazine type. These compounds can be used individually or in mixtures, with or without sterically hindered amines (HALS).

The compositions may also comprise dyes and/or white and colored pigments. Depending on the kind of application organic as well as anorganic pigments are used. Such additives are known to the person skilled in the art, some examples are titan dioxide pigments, e.g. of the rutile type or anatas type, carbon black, zinc oxide, such as zink white, iron oxide, such as iron oxide yellow, iron oxide red, chromium yellow, chromium green, nickel titanium yellow, ultramarine blue, cobalt blue, bismuth vanadate, cadmiumyellow or cadmium red. Examples of organic pigments are mono- or bisazo pigments, as well as metal complexes thereof, phthalocyanine pigments, polycyclic pigments, such as perylene-, anthraquinone-, thioindigo-, chinacridone- or triphenylmethane pigments, as well as diketopyrrolo-pyrole-, isoindolinone-, e.g. tetrachlorisoindolinone-, isoindoline-, dioxazin-, benzimidazolone- and chinophthalone pigments.

The pigments are employed alone or in combination in the compositions according to the invention.

Depending on the intended use the pigments are used in amount customary in the art, for example in an amount of 1-60% by weight, or 10-30% by weight, based on the whole formulation.

The compositions may also comprise organic dyes of different classes. Examples are azo dyes, methin dyes, anthraquinone dyes or metal complex dyes. Customary concentrations are for example 0.1-20%, in particular 1-5%, based on the whole formulation.

The choice of additive is made depending on the field of application and on properties required for this field. The additives described above are customary in the art and accordingly are added in amounts which are usual in the respective application.

In some cases it may be advantageous to carry out heating during or after exposure to light. In this way it is possible in many cases to accelerate the crosslinking reaction.

In the above described processes according to the invention, instead of irradiating with electromagnetic radiation the mixture comprising the latent catalyst of the invention can be subjected to a heat treatment. Another possibility, as mentioned above, is to irradiate the reaction mixture with electromagnetic radiation and simultaneously with irradiating or after the irradiation subject it to a heat treatment.

Subject of the invention therefore also is a process as described above, characterized in that instead of irradiating with electromagnetic radiation the mixture is subjected to a heat treatment, or the mixture is irradiated with electromagnetic radiation and simultaneously with or after the irradiation subjected to a heat treatment.

The compositions of the invention can be employed for various purposes, for example as printing inks, as clearcoats, as white paints, for example for wood, plastics or metal, as coatings, inter alia for paper, wood, metal or plastic, as powder coatings, as daylight-curable exterior coatings for marking buildings and roads, for photographic reproduction processes, for holographic recording materials, for image recording processes or for the production of printing plates which can be developed using organic solvents or aqueous-alkaline media, for the production of masks for screen printing, as dental filling materials, as adhesives, including pressure-sensitive adhesives and moisture curing silane modified adhesives, for sealings, as laminating resins, as etch resists or permanent resists and as solder masks for electronic circuits, for potting components, for mouldings, for the production of three-dimensional articles by mass curing (UV curing in transparent moulds) or by the stereo-lithography process, as is described, for example, in U.S. Pat. No. 4,575,330, for the preparation of composite materials (for example styrenic polyesters, which may contain glass fibres and/or other fibres and other assistants) and other thick-layer compositions, for the coating or encapsulation of electronic components, or as coatings for optical fibres.

In surface coatings, it is common to use mixtures of a prepolymer with polyunsaturated monomers which also contain a monounsaturated monomer. The prepolymer here is primarily responsible for the properties of the coating film, and varying it allows the skilled worker to influence the properties of the cured film. The polyunsaturated monomer functions as a crosslinker, which renders the coating film insoluble. The monounsaturated monomer functions as a reactive diluent, by means of which the viscosity is reduced without the need to use a solvent.

The compositions according to the invention are also suitable for use in uv-curing adhesives, e.g. in the preparation of pressure-sensitive adhesives, laminating adhesives, hot-melt adhesives, moisture-cure adhesives, silane reactive adhesives or silane reactive sealants and the like, and related applications.

Said adhesives can be hot melt adhesives as well waterborne or solvent borne adhesives, liquid solventless adhesives or 2-part reactive adhesives. In particular suitable are pressure-sensitive adhesives (PSA), for example uv-curable hot melt pressure sensitive adhesives. Said adhesives for example comprise at least one rubber component, at least one resin component as tackyfier and at least one oil component, for example in the weight ratio 30:50:20. Suitable tackyfiers are natural or synthetic resins. The person skilled in the art is aware of suitable corresponding compounds as well as of suitable oil components or rubbers.

The pre-polymerized adhesives containing the isocyanates, for example in blocked form, can for example be processed at high temperature and coated onto the substrate following the hotmelt process, afterwards full cure is achieved by an additional curing step involving the blocked isocyanates, which is realized by photoactivation of the photolatent catalyst.

Hotmelt adhesives are interesting as pressure sensitive adhesives and suitable to replace the use of solvent base compositions, which from an environmental point of view are unwanted. The hotmelt extrusion process in order to achieve the high flow viscosity necessitates high application temperatures. The compositions of the present invention comprising isocyanates are suitable as crosslinkers in the preparation of a hotmelt coating, where the crosslinkers enter into a chemical reaction with the functional comonomers of the (meth)acrylate PSA. After the coating operation, the PSAs are first crosslinked thermally, or implementing the dual crosslinking mechanism, the PSA is subsequently crosslinked with UV light. UV crosslinking irradiation takes place by means of shortwave ultraviolet radiation in a wavelength range from 200 to 400 nm, even expanding in the visible range, e.g. up to 650 nm, depending on the source of the UV radiation equipment, as well as on the photolatent metal catalyst. Such systems and processes are for example described in US 2006/0052472, the disclosure of which hereby is incorporated by reference.

The composition of the present invention is suitable for application on a variety of substrates, e.g. it is especially suitable for providing clear coatings in automotive OEM (Original Equipment Manufacture) or refinish applications typically used in coating car bodies. The coating composition of the present invention can for example be formulated in the form of a clear coating composition, pigmented composition, metallized coating composition, basecoat composition, monocoat composition or a primer. The substrate is for example prepared with a primer and or a color coat or other surface preparation prior to coating with the present compositions.

Suitable substrates for applying the coating composition of the present invention include automobile bodies (or vehicle bodies in general), any and all items manufactured and painted by automobile sub-suppliers, frame rails, commercial trucks and truck bodies, including but not limited to for example beverage bodies, utility bodies, vehicle bodies, e.g. ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft, etc.

The substrate further includes industrial and commercial new construction and maintenance thereof; cement and wood floors; walls of commercial and residential structures, such as for example office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods and sporting equipment, e.g. golf balls, ski, snowboards; etc.

However, the composition of the present invention may also generally be applied on substrates like for example plastics, metals, glass, ceramics, etc. e.g. in it's function as an adhesive (but not limited thereto).

The compositions of the present invention are also suitable for "dual-cure" applications. Dual-cure is meant to be a system which comprises heat-crosslinking components and UV-crosslinking components as well, such as for example a 2K polyurethane (as heat-curable component) and an acrylate component (as the UV-curable component).

Said "dual-cure" compositions are cured by a combination of exposure to radiation and heating, wherein the irradiation and heating are either performed simultaneously or first the irradiation step is performed, followed by heating, or, the composition first is heated, followed by exposure to radiation.

The "dual-cure" compositions generally comprise an initiator compound for the heat-curing component and a photoactive compound according to the present invention for the photocuring step. However, the compounds of the invention alone can function as initiator for both systems heat-crosslinking components and UV-crosslinking components as well.

The compositions of the invention are suitable, for example, as coating materials for substrates of all kinds, examples being wood, textiles, paper, ceramic, glass, plastics such as polyesters, polycarbonates, polyethylene terephthalate, polyamides, polyolefins or cellulose acetate, especially in the form of films, and also metals such as Al, Cu, Ni, Fe, Zn, Mg or Co and GaAs, Si or $SiO_2$, on which it is the intention to apply a protective coating or, by imagewise exposure, an image.

The substrates can be coated by applying a liquid composition, a solution, dispersion, emulsion or suspension to the substrate. The choice of solvent and the concentration depend predominantly on the type of composition and the coating process. The solvent should be inert: in other words, it should not undergo any chemical reaction with the components and should be capable of being removed again after the coating operation, in the drying process. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

Using known coating processes, the solution is applied uniformly to a substrate, for example by spin coating, dip coating, knife coating, curtain coating, brushing, spraying—especially electrostatic spraying—and reverse roll coating and by electrophoretic deposition. It is also possible to apply the layer to a temporary, flexible support and then to coat the final substrate, for example a copper-clad circuit board, by means of layer transfer via lamination.

The amount applied (layer thickness) and the nature of the substrate (layer support) are functions of the desired field of application. The range of layer thicknesses generally comprises values from about 0.1 μm to several mm, for example 1-2000 μm, preferably 5 to 200 μm, in particular 5-60 μm (after evaporation of the solvent).

The compositions according to the invention are also suitable for use in electrodeposition paint or primer: an electrodeposition paint generally consists of a resin containing hydroxyl groups as a base resin and a polyisocyanate compound, optionally blocked with a blocking agent, as a curing agent. The electrodeposition step can be conducted, for example, under the condition of load voltage of 50-400 kV by adjusting usually to 15-35° C. the temperature of the electrodeposition bath comprising the resin composition for electrodeposition paint which has been diluted with deionized water etc. to a solid content concentration of about 5-40% by weight and adjusted pH of the system in the range of 4-9.

The film thickness of the electrodeposition coatings film formable by using the resin composition for electrodeposition paint is not particularly restricted. Preferably it generally is in the range of 10-40 μm based upon a cured film thickness. UV crosslinking irradiation takes place by means of shortwave ultraviolet radiation in a wavelength range from 200 to 650 nm, depending on the UV photoactive moiety in the catalyst according to the present invention and of the used photosensitizer. It is also possible to simultaneously or afterwards submit the electrodeposited paint to a thermal curing step. Examples of such paints are described in US 2005/0131193 and US 2001/0053828, both hereby are incorporated by reference.

The compositions of the present invention are also used to prepare "powder coating compositions" or "powder coatings", either thermal curing or radiation-curable curing ones. By "powder coating compositions" or "powder coatings" is meant the definition as described in "Ullmann's Encyclopedia of Industrial Chemistry, 5th, Completely Revised Edition, Vol. A 18", pages 438 to 444 (1991) in Section 3.4. That is powder coatings are formed by thermoplastic or bakable, crosslinkable polymers, which are applied in powder form to, predominantly metallic, substrates. The way in which the powder is brought into contact with the workpiece that is to be coated typifies the various application techniques, such as electrostatic powder spraying, electrostatic fluidized-bed sintering, fixed bed sintering, fluidized-bed sintering, rotational sintering or centrifugal sintering.

Preferred organic film-forming binders for the powder coating compositions are stoving systems based, for example, on epoxy resins, polyester-hydroxyalkylamides, polyester-glycolurils, epoxy-polyester resins, polyester-triglycidyl isocyanurates, hydroxy-functional polyester-blocked polyisocyanates, hydroxy-functional polyester-uretdiones, acrylate resins with hardener, or mixtures of such resins.

Radiation-curable powder coatings are for example based on solid resins and monomers containing reactive double bonds, for example maleates, vinyl ethers, acrylates, acrylamides and mixtures thereof. A UV-curable powder coating—in admixture with the composition of the present invention—can for example be formulated by mixing unsaturated polyester resins with solid acrylamides (for example methyl methylacrylamidoglycolate), acrylates, methacrylates or vinyl ethers and a free-radical photoinitiator, such formulations being as described, for example, in the paper "Radiation Curing of Powder Coating", Conference Proceedings, Radtech Europe 1993 by M. Wittig and Th. Gohmann. The powder coatings may also comprise binders as are described, for example, in DE 4228514 and in EP 636669.

The powder coatings may additionally comprise white or coloured pigments. For example, preferably rutile titanium dioxide can be employed in concentrations of up to 50% by weight in order to give a cured powder coating of good hiding power. The procedure normally comprises electrostatic or tribostatic spraying of the powder onto the substrate, for example metal or wood, melting of the powder by heating, and, after a smooth film has formed, radiation-curing of the coating with ultraviolet and/or visible light.

The composition of the present invention for example further may be employed for the preparation of printing inks. Printing inks in general are known to the person skilled in the art, are used widely in the art and are described in the literature. They are, for example, pigmented printing inks and printing inks coloured with dyes.

The radiation-sensitive compositions of the invention can also be subjected to imagewise exposure. In this case they are used as negative resists. They are suitable for electronics (galvanoresists, etch resists and solder resists), for the production of printing plates, such as offset printing plates, flexographic and relief printing plates or screen printing plates, for the production of marking stamps, and can be used for chemical milling or as microresists in the production of integrated circuits. There is a correspondingly wide range of variation in the possible layer supports and in the processing conditions of the coated substrates.

The term "imagewise" exposure relates both to exposure through a photomask containing a predetermined pattern, for example a slide, exposure by a laser beam which is moved under computer control, for example, over the surface of the coated substrate and so generates an image, and irradiation with computer-controlled electron beams. Following the imagewise exposure of the material and prior to developing, it may be advantageous to carry out a brief thermal treatment, in which only the exposed parts are thermally cured. The temperatures employed are generally 50-150° C. and preferably 80-130° C.; the duration of the thermal treatment is generally between 0.25 and 10 minutes.

A further field of use for photocuring is that of metal coating, for example the surface-coating of metal panels and tubes, cans or bottle tops, and photocuring on polymer coatings, for example of floor or wall coverings based on PVC.

Examples of the photocuring of paper coatings are the colourless varnishing of labels, record sleeves or book covers.

The use of the compositions of the invention for preparing shaped articles made from composite compositions is likewise of interest. The composite composition is made up of a self-supporting matrix material, for example a glass-fibre fabric, or else, for example, of plant fibres [cf. K. -P. Mieck, T. Reussmann in Kunststoffe 85 (1995), 366-370], which is impregnated with the photocuring formulation. Shaped articles which are produced from compositions according to the invention are of high mechanical stability and resistance. The compositions of the invention can also be used in moulding, impregnating and coating compositions, as are described, for example, in EP 007086. Examples of such compositions are fine coating resins on which stringent requirements are placed with respect to their curing activity and resistance to yellowing, or fibre-reinforced mouldings such as planar or longitudinally or transversely corrugated light diffusing panels.

The sensitivity of the novel compositions to radiation generally extends from about 190 nm through the UV region and into the infrared region (about 20,000 nm, in particular 1200 nm), especially from 190 nm to 650 nm (depending on the photoinititator moiety, optionally in combination with a sensitizer as described hereinbefore) and therefore spans a very broad range. Suitable radiation is present, for example, in sunlight or light from artificial light sources. Consequently, a large number of very different types of light sources are employed. Both point sources and arrays ("lamp carpets") are suitable. Examples are carbon arc lamps, xenon arc lamps, medium-, super high-, high- and low-pressure mercury lamps, possibly with metal halide dopes (metal-halogen lamps), microwave-stimulated metal vapour lamps, excimer lamps, superactinic fluorescent tubes, fluorescent lamps, argon incandescent lamps, electronic flashlights, photographic flood lamps, electron beams and X-rays. The distance between the lamp and the substrate to be exposed in accordance with the invention may vary depending on the intended application and the type and output of lamp, and may be, for example, from 2 cm to 150 cm. Laser light sources, for example excimer lasers, such as krypton F lasers for exposure at 248 nm are also suitable. Lasers in the visible region can also be employed.

Alternatively, the actinic radiation is provided by light emitting diodes (LED) or organic light emitting diodes (OLED), e.g. UV light emitting diodes (UV-LED). Said LEDs allow instant on and off switching of the radiation source. Further, UV-LEDs generally have a narrow wavelength distribution and offer the possibility to customize the peak wavelength and also provide an efficient conversion of electric energy to UV radiation.

As mentioned above, depending on the light source used it is advantageous in many cases to employ a sensitizer, as described above, whose absorption spectrum coincides as closely as possible to the emission spectrum of the radiation source.

The Ti-oxo-chelate compounds (and formulations) of the present invention are stable against hydrolysis, provide a good pot-life and a good photolatency in the compositions containing these catalysts.

The examples which follow illustrate the invention in more detail, without restricting the scope of the invention to said examples only. Parts and percentages are, as in the remainder of the description and in the claims, by weight, unless stated otherwise. Where alkyl radicals having more than three carbon atoms are referred to in the examples without any mention of specific isomers, the n-isomers are meant in each case.

Preparation of the Catalysts:

The starting diisopropoxy-1,3-dionato titanium complexes are prepared as described in WO2009/050115 and WO2011/032875.

EXAMPLE 1

Catalyst 1

Preparation of oxo-bis(4,4-dimethyl-1-(2,4,6-trimethylphenyl)-1,3-pentanedionato)-titanium

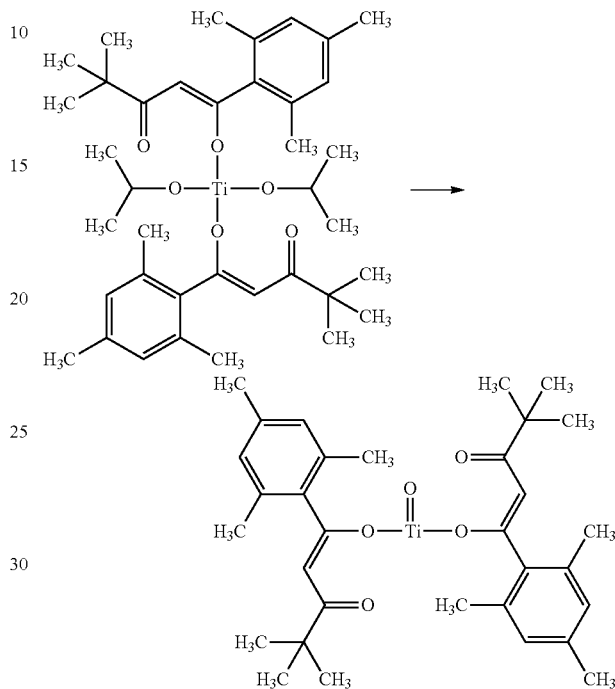

In a 50 ml dry three-neck-flask 2.63 g (4 mmol) of diisopropoxy-bis(4,4-dimethyl-1-(2,4,6-trimethylphenyl)-1,3-pentanedionato)-titanium are dissolved in 10 ml hexane. 0.22 g (12 mmol) of $H_2O$ are added and the reaction mixture is stirred at 50° C. for 3 h. The reaction mixture is then evaporated and dried under reduced pressure to give a solid residue which is re-crystallized from diethyl ether to afford 0.98 g of the title compound as a yellowish solid. M.p. 250-251° C.

EXAMPLE 2

Catalyst 2

Preparation of oxo-bis(4,4-dimethyl-1-(3,4-dimethoxylphenyl)-1,3-pentanedionato)-titanium

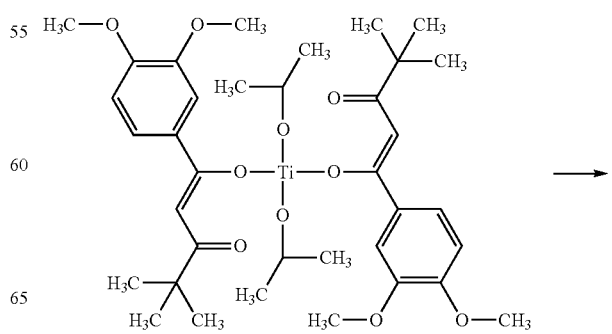

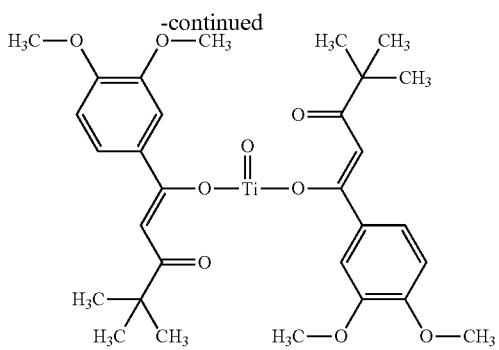

In a 50 ml dry three-neck-flask 0.78 g (1.13 mmol) of diisopropoxy-bis(4,4-dimethyl-1-(3,4-dimethoxylphenyl)-1,3-pentanedionato)-titanium are dissolved in 5 ml acetone. 0.04 g (2.26 mmol) of H$_2$O are added and the reaction mixture is stirred at 50° C. for 6 h. The resulting suspension is then filtered and the filter cake is dried under reduced pressure to yield 0.49 g of the title compound as a yellowish solid. M.p. 237-240° C.

EXAMPLE 3

Catalysts 3-13

The catalysts 3-13 are prepared according to the method as given in examples 1 and 2 for catalysts 1 and 2 using the appropriate diisopropoxy-1,3-dionato titanium starting material. The compounds and physical data are listed in table 1 below.

TABLE 1

| catalyst | starting material/ preparation method | structure | physical data |
|---|---|---|---|
| 3 | diisopropoxy-bis(4,4-dimethyl-1-(4-dimethylaminophenyl)-1,3-pentanedionato)-titanium/ method of example 1 | | orange solid; M.p. 279-281° C. |
| 4 | diisopropoxy-bis(4,4-dimethyl-1-(2,5-dimethoxyphenyl)-1,3-pentanedionato)-titanium/ method of example 1 | | yellow solid; M.p. 199-201° C. |
| 5 | diisopropoxy-bis(4,4-dimethyl-1-(2,6-dimethoxyphenyl)-1,3-pentanedionato)-titanium/ method of example 2 | | yellow solid M.p. 296-298° C. |

TABLE 1-continued

| catalyst | starting material/ preparation method | structure | physical data |
|---|---|---|---|
| 6 | diisopropoxy-bis(4,4-dimethyl-1-(3,5-dimethoxyphenyl)-1,3-pentanedionato)-Titanium/ method of example 1 | | yellow solid M.p. 251-253° C. |
| 7 | dibutoxy-bis(4,4-dimethyl-1-(4-methoxyphenyl)-1,3-pentanedionato)-titanium/ method of example 1 | | yellowish solid; M.p. 308-310° C. |
| 8 | diisopropoxy-bis(4-methyl-1-phenyl-1,3-pentanedionato)-titanium/ method of example 1 | | yellow solid M.p. 183-184° C. |
| 9 | diisopropoxy-bis(1,1,1-trifluoro-4-phenyl-2,4-butanedionato)-titanium/ method of example 1 | | yellow solid M.p. 296-297° C. |

TABLE 1-continued

| catalyst | starting material/ preparation method | structure | physical data |
|---|---|---|---|
| 10 | diisopropoxy-bis(1,3-di-phenyl-1,3-propane-dionato)-titanium/ method of example 2 | | yellow solid M.p. 335-337° C. |
| 11 | diisopropoxy-bis(3-(1-methyl)cyclohexyl-1-phenyl)-1,3-propane-dionato)-titanium/ method of example 1 | | yellowish solid M.p. 282-283° C. |
| 12 | diisopropoxy-bis(4,4-dimethyl-1-phenyl-1,3-pentanedionato)-titanium/ method of example 1 | | yellowish solid M.p. 313° C. |

Catalyst 12

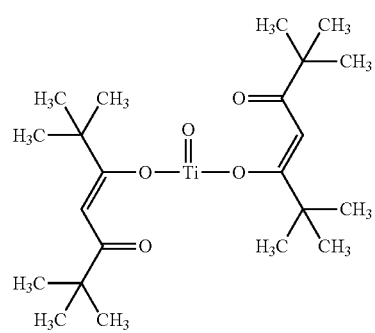

(CAS 152248-674) is a commercially available compound.

APPLICATION EXAMPLES

The following commercially available 1,3-diketones are used in the application examples:

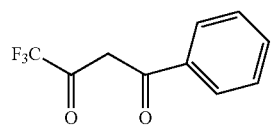

CAS 326-06-7

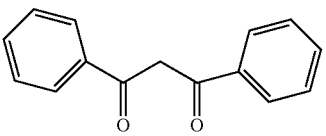

CAS 120-46-7

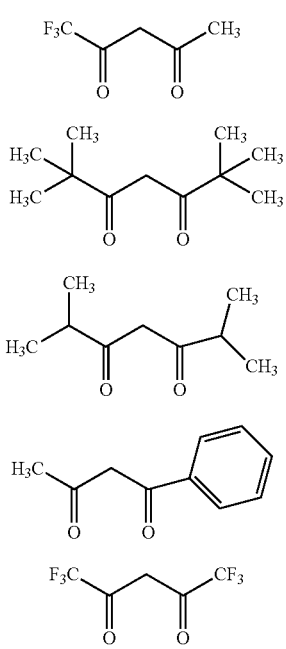

CAS 22767-90-4

CAS 1118-71-4

CAS 18362-64-6

CAS 13988-67-5

CAS 1522-22-1

Curing and Pot-life of a two packs polyurethane system based on a polyacrylic polyol and an aliphatic polyisocyanate:

The polyurethane is the reaction product of two basic components: a polyol (Component A) and a polyisocyanate (Component B). An organometallic photolatent catalyst is added to the total composition of A and B in order to speed up the reaction of A with B.

In the following examples A1 to A4, Component A includes all ingredients other than the polyisocyanate. The photolatent catalyst and the 1,3 diketone are dissolved carefully into Component A prior to the addition of Component B.

Component A

| | | |
|---|---|---|
| 73.1 parts of | a polyacrylate polyol (70% in butyl acetate; Desmophen A HS 1170 BA, provided by Bayer Material Science) | |
| 2.3 parts of | an additive blend (consisting of 0.9 parts of a solution of polyacrylates as flow improvers, 0.7 parts of a silicon defoamer and 0.7 parts of a polyether modified dimethylpolysiloxane as silicon surface additive) | |
| 24.6 parts of | xylene/methoxypropylacetate/butylacetate (1/1/1) | |

Component B

Aliphatic polyisocyanate [(Hexamethylenediisocyanate-Trimer) 90% in solvent blend; Desmodur N 3390, provided by Bayer Material Science]

The basic testing formulations are composed of:

| 7.52 | parts of | component A |
|---|---|---|
| 2.00 | parts of | component B |

EXAMPLE A1

Catalyst Efficiency Before and after Activation by UV Light

The testing samples are prepared by adding the photolatent Ti catalysts ("Catalyst") to 7.52 g of component A of the basic testing formulation as described above.

After completing the mixing of component A with 2 g of component B, the mixtures are applied with a 76 μm split coater on two glass plates of 30 cm length. One plate is irradiated using an UV processor from IST Metz (2 mercury lamps operated at 100 W/cm) at a belt speed of 5 m/min, whereas the second glass plate is not irradiated. The reactivity of the mixtures is determined by measuring the "tack free time" of the applied formulation (coated glass plate) by means of a drying recorder from Byk Gardner, where a needle is moving with a constant speed over the coated substrate for 24 hrs. The recording is carried out in the dark, at room temperature. The "tack free time" is the period of time needed for the sample to cure in such a manner that no tack is left on the surface upon touch of the needle from the recorder.

The lower the value of the "tack free time", the faster is the addition reaction of the polyol to the polyisocyanate.

The higher the difference between the value of the "tack free time" of the irradiated sample and the non-irradiated sample (with a tack free value of the irradiated sample, which is lower than the one of the non-irradiated one), the more "photolatent" is the catalyst. The catalysts which are used in the test as well as the results are collected in the following table 1.

TABLE 1

| | Tack free time (stage 3/4) in hrs. | |
|---|---|---|
| Catalyst/(g) | No UV irradiation | 2 × 100 W/cm @ 5 m/min |
| Catalyst 1/(0.0174) | 13 | 7 |
| Catalyst 2/(0.0185) | 11 | 6.75 |
| Catalyst 3/(0.0174) | 10 | 6.25 |
| Catalyst 4/(0.0185) | 9.25 | 4.75 |
| Catalyst 7/(0.0166) | 9 | 5.5 |
| Catalyst 8/(0.0139) | 11 | 6 |
| Catalyst 9/(0.0155) | 10.5 | 7 |

EXAMPLE A2

Formulation Stability (Pot-Life)

The testing samples are prepared by adding the Ti catalyst ("Catalyst") and 1,3-diketone free ligand ("Additive") to 7.52 g of component A of the basic testing formulation of example A1. After mixing component A with 2.0 g of component B, the visual pot-life of the formulation (time where no change in viscosity is visible) is observed: the gelled time, the time to considerable viscosity, and the time to high viscosity are determined, while storing the samples in dark flasks.

The catalysts and additives which are used in the test as well as the results of the tests are collected in the following table 2.

TABLE 2

| Catalyst/(g) | Additive/(g) | Gelled Time (min.) | Considerably viscous (min.) | Highly viscous (min.) |
|---|---|---|---|---|
| — | — | >600 | | >3000 |
| Catalyst 13/ (0.059) | — | 65 | 115 | 140 |
| Catalyst 13/ (0.059) | CAS 13988-67-5/ (0.007) | 65 | 165 | 200 |
| Catalyst 13/ (0.059) | CAS 13988-67-5/ (0.015) | 180 | 285 | 305 |
| Catalyst 13/ (0.059) | CAS 13988-67-5/ (0.059) | 510 < t < 960 | 510 < t < 960 | 510 < t < 960 |
| Catalyst 13/ (0.059) | CAS 326-06-7/ (0.015) | 270 | 390 | 460 |
| Catalyst 13/ (0.059) | CAS 120-46-7/ 0.015 | 120 | 210 | 280 |
| Catalyst 13/ (0.059) | CAS 18362-64-6/ (0.015) | 210 | 330 | 390 |
| Catalyst 13/ (0.059) | CAS 1522-22-1/ (0.015) | 120 | 240 | 280 |
| Catalyst 13/ (0.059) | CAS 22767-90-4/ (0.015) | 240 | 390 | 510 |
| Catalyst 13/ (0.059) | CAS 1118-71-4/ (0.015) | 180 | 300 | 390 |
| Catalyst 8/ (0.055) | — | 120 | 210 | 255 |
| Catalyst 8/ (0.055) | CAS 13988-67-5/ (0.014) | 180 | 300 | 390 |
| Catalyst 12/ (0.054) | — | 300 | 510 | 540 < t < 990 |
| Catalyst 12/ (0.054) | CAS 1118-71-4/ (0.013) | 540 < t < 990 | 540 < t < 990 | 540 < t < 990 |
| Catalyst 12/ (0.054) | CAS 13988-67-5/ (0.013) | 540 < t < 990 | 540 < t < 990 | 540 < t < 990 |

TABLE 3

| Catalyst (g)/ Ligand CAS (g) | Ratio | Viscosity at 25° C. (poises) | | | | | | | |
|---|---|---|---|---|---|---|---|---|---|
| | | 0 h | 1 h | 2 h | 3 h | 4 h | 5 h | 6 h | 7 h |
| Catalyst 2 (0.0185) | — | 1.4 | 2.7 | 4.3 | 7.8 | 16.6 | 35.2 | ## | ## |
| Catalyst 2 (0.0185)/ 13988-67-5 (0.0046) | 80/20 | 1.2 | 1.5 | 1.9 | 2.4 | 3.1 | 3.6 | 5 | 5.8 |
| Catalyst 2 (0.0185)/ 13988-67-5 ((0.0079) | 70/30 | 1.2 | 1.5 | 1.8 | 2 | 2.5 | 2.9 | 3.5 | 4 |
| Catalyst 3 (0.0174) | — | 1.6 | 3.5 | 7.4 | 16 | 52 | ## | ## | ## |
| Catalyst 3 (0.0174)/ 13988-67-5 (0.0044) | 80/20 | 1.1 | 2 | 3 | 4.2 | 6 | 9 | 12.8 | 17.6 |
| Catalyst 3 (0.0174)/ 13988-67-5 (0.0075) | 70/30 | 1.1 | 1.8 | 3 | 3.8 | 5 | 7 | 10 | 12.4 |
| Catalyst 4 (0.0185) | — | 1.8 | 3.8 | 6.5 | 28 | ## | ## | ## | ## |
| Catalyst 4 (0.0185)/ 13988-67-5 (0.0046) | 80/20 | 1.1 | 2.1 | 2.8 | 4 | 6.1 | 9.3 | 12 | 16 |
| Catalyst 4 (0.0185)/ 13988-67-5 (0.0079) | 70/30 | 1.1 | 1.7 | 2.5 | 3.5 | 4.2 | 5.8 | 7.1 | 8.8 |
| Catalyst 7 (0.0166) | — | 1.6 | 3.3 | 6 | 13 | 34.4 | ## | ## | ## |
| Catalyst 7 (0.0166)/ 13988-67-5 (0.0042) | 80/20 | 1.1 | 1.7 | 2.4 | 3.5 | 4.2 | 5.8 | 8 | 10.8 |
| Catalyst 7 (0.0166)/ 13988-67-5 (0.0071) | 70/30 | 1.2 | 1.5 | 2.1 | 2.8 | 3.6 | 5.6 | 7 | 7.8 |

Gelled

EXAMPLE A 3

Formulation Stability

Shelf-Life (Viscosity Evolution)

The testing samples are prepared by adding photolatent Ti catalyst ("Catalyst"), and 1,3-diketone free ligand (CAS 13988-67-5) to 7.52 g of component A of the basic testing formulation of example A1. The amount of ligand is adjusted to have the following weight ratios between the organometallic photolatent catalyst and the ligand: 70/30, 80/20.

After admixing component A with 2 g of component B, the mixtures are stored in the dark at room temperature. The shelflife of each formulation is monitored by measuring the viscosity at 25° C. by means of a viscometer from Epprecht Instruments+Control AG. The measurements are done after the preparation of the formulation and each hour for 7 h. The viscosity increases with the time. The lower the increase of the viscosity, the longer is the shelflife of the formulation and consequently the larger is the working window. The catalyst and ligand which are used in the experiment as well as results are presented in the following table 3.

EXAMPLE A 4

Ratio "Catalyst/Ligand" efficiency before and after activation by UV-light The testing samples are prepared by adding photolatent Ti catalysts and 1,3-diketone free ligand (CAS 13988-67-5) to 7.52 g of component A of the basic testing formulation of example A1. The amount of ligand is adjusted to have the following weight ratios between the organometallic photolatent catalyst and ligand: 70/30, 80/20.

After mixing component A with 2 g of component B, the mixtures are applied with a 76 μm split coater on two glass plates of 30 cm length. One plate is irradiated using a UV processor from IST Metz (2 mercury lamps operated at 100 W/cm) at a belt speed of 5 m/min, whereas the second one is not irradiated. The reactivity of the mixtures is determined by measuring the "tack free time". Therefore the samples are set up on a drying recorder from ByK Gardner, where a needle is moving with a constant speed for 24 h over the coated substrate. The recording is carried out in the dark, at room temperature.

The "tack free time" is the period of time needed for the sample to cure in such a manner that no tack is left on the surface upon touch of the needle in the recorder.

The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst. The catalysts and ligand which are used in the test as well as the results are collected in the following table 4.

TABLE 4

| Catalyst (g) | | Tack free time (stage 3/4) h | |
|---|---|---|---|
| ligand (g) | Ratio | No irradiation | 2 × 100 W 5 m/min |
| Catalyst 2 (0.0185)/ CAS 13988-67-5 (0.0046) | 80/20 | 16 | 13 |
| Catalyst 2 (0.0185)/ CAS 13988-67-5 (0.0079) | 70/30 | 17 | 11.5 |
| Catalyst 3 (0.0174)/ CAS 13988-67-5 (0.0044) | 80/20 | 14.5 | 11 |
| Catalyst 3 (0.0174)/ CAS 13988-67-5 (0.0075) | 70/30 | 13.5 | 9.5 |
| Catalyst 4 (0.0185)/ CAS 13988-67-5 (0.0046) | 80/20 | 14 | 8 |
| Catalyst 4 (0.0185)/ CAS 13988-67-5 (0.0079) | 70/30 | 14.5 | 6.5 |
| Catalyst7 (0.0166)/ CAS 13988-67-5 (0.0042) | 80/20 | 12.5 | 9.75 |
| Catalyst7 (0.0166)/ CAS 13988-67-5 (0.0071) | 70/30 | 14.5 | 9.75 |

In the following Example A5 Component A' includes all ingredients other than the polyisocyanate. The photolatent catalyst (Catalyst 12) alone or in combination with 1,3 diketone (CAS1118-71-4) is added into Component A' prior to the addition of Component B'.

Component A'

| 104 | parts of | a polyacrylate polyol (80% in butylacetate; Joncryl®507, provided by BASF SE) |
| 1.2 | parts of | an organically modified polysiloxane, EFKA® 3030, used as levelling agent |
| 51.2 | parts of | Butylacetate (BuAc) |

Component B'

Aliphatic polyisocyanate [(Hexamethylenediisocyanate-Trimer), 100% solid; Basonat® HI 100, provided by BASF SE]

The basic testing formulations are composed of:

| 40 | parts of | component A' |
| 10.24 | parts of | component B' |

Prior to their addition in the Component A', the following catalytic solutions containing the catalyst and the ligand are prepared:

Catalytic Solutions

| | Catalyst 12 (10% in BuAc) | Catalyst 12/CAS 1118-71-4 (70/30) (50% in BuAc) |
|---|---|---|
| Catalyst 12 | 10 | 35 |
| CAS 1118-71-4 | — | 15 |
| butylacetate (BuAc) | 90 | 50 |
| % metal | 1.10% | 3.90% |

EXAMPLE A5

Reactivity after UV-exposure of catalyst 12 with and without addition of ligand CAS 1118-71-4

The testing samples are prepared by adding the catalytic solutions, described above to component A' of the basic testing formulation.

After completing the mixing of component A' with 10.24 of component B', the mixtures are applied with a 76 μm split coater on three glass plates of 30 cm length. One plate is three times in a row, irradiated using an UV processor from IST Metz, type BLK-U-30-2×1-SS-tr-N2 (1 mercury lamp operated at 100 W/cm) at a belt speed of 10 m/min, the second plate is irradiated during 6 minutes under Dr. Hoenle Lamp—Type UVA spot 400T (distance is 20 cm), whereas the third glass plate is not irradiated. The reactivity of the mixtures is determined by measuring the "tack free time" of the applied formulation (coated glass plate) by means of a drying recorder from Byk Gardner, where a needle is moving with a constant speed over the coated substrate for 24 hrs. The recording is carried out in the dark, at room temperature. The "tack free time" is the period of time needed for the sample to cure in such a manner that no tack is left on the surface upon touch of the needle from the recorder.

The lower the value of the "tack free time", the faster is the addition reaction of the polyol to the polyisocyanate.

The higher the difference between the value of the "tack free time" of the irradiated sample and the non-irradiated sample (with a tack free value of the irradiated sample, which is lower than the one of the non-irradiated one), the more "photolatent" is the catalyst. The catalysts which are used in the test as well as the results are collected in the following table 5.

TABLE 5

| | Tack free time (stage 3/4) in hrs. | | |
|---|---|---|---|
| Catalyst (g) | No UV irradiation | 3 passes under 1 × 100 W/cm @ 10 m/min | 6 min under UVA spot |
| Catalyst 12 (10% in BuAc) 0.716 g | 21 | 14.5 | 4.75 |
| Catalyst 12 (10% in BuAc) 0.358 g | 18.5 | 16 | 6.75 |
| Catalyst 12/CAS 1118-71-4 (70/30) (50% in BuAc) 0.2 g | 16.25 | 9 | 3.25 |

EXAMPLE A6

Adhesive Formulation for Film to Film Lamination

The solventless reactive polyurethane test adhesive is a common system for film to film lamination in the flexible packaging industry. Prior to the application 14 parts of the isocyanate component of the solventless adhesive are dissolved in 7 parts ethylacetate and then 4 parts of the hydroxy component are added and mixed. The photo-latent catalyst 12 is mixed into the hydroxy component.

The adhesive is knife-coated in a dry layer thickness of 2.5 g/m² (solids) onto various commercially available polymer films. After being coated the samples are dried with a stream of hot air and then treated with UV light by a standard mercury medium pressure vapour lamp. The coated polymer films are laminated to a second polymer film in a calander at 23° C. and under a pressure of 6.5 bar. The prepared film-to-film laminates are well adhering.

The invention claimed is:

1. A titanium-oxo-chelate catalyst formulation, comprising:
(i) 50-99% by weight of at least one compound of formula I

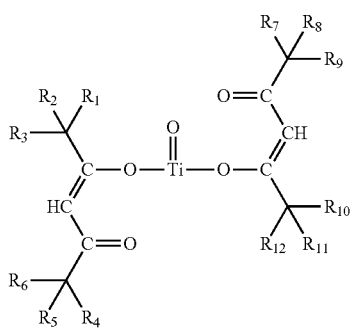

wherein
$R_1$, $R_2$, and $R_3$ together with the C-atom to which they are attached form a $C_6$-$C_{14}$ aryl group which is unsubstituted or substituted by one, two or three $C_1$-$C_8$ alkyl, halogen, $OR_{13}$ or $NR_{13}R_{14}$;
$R_{10}$, $R_{11}$, and $R_{12}$ together with the C-atom to which they are attached form a $C_6$-$C_{14}$ aryl group which is unsubstituted or substituted by one, two or three $C_1$-$C_8$ alkyl, halogen, $OR_{13}$, or $NR_{13}R_{14}$;
$R_4$, $R_5$, $R_6$, $R_7$, $R_8$, $R_9$ independently of each other are hydrogen, halogen, $C_1$-$C_{20}$ alkyl, or $C_6$-$C_{14}$ aryl which is unsubstituted or substituted by one, two or three $C_1$-$C_8$ alkyl, halogen, $OR_{13}$, or $NR_{13}R_{14}$;
provided that only one of $R_4$, $R_5$, and $R_6$ in the group

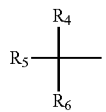

and only one of $R_7$, $R_8$, and $R_9$ in the group

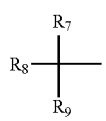

can be hydrogen;
or $R_4$, $R_5$, and $R_6$ and/or $R_7$, $R_8$, and $R_9$ together with the C-atom to which they are attached each form a $C_6$-$C_{14}$ aryl group which is unsubstituted or substituted by one, two or three $C_1$-$C_8$ alkyl, halogen, $OR_{13}$, or $NR_{13}R_{14}$;
or $R_4$ and $R_5$ and/or $R_7$ and $R_8$ together with the C-atom to which they are attached form a 5- to 7-membered carbocyclic ring; and (ii) 1-50% by weight of at least one chelate ligand compound of the formula IIa, IIb, or IIc

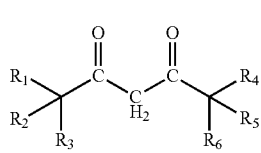

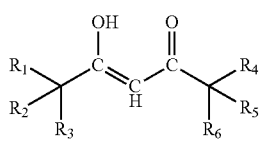

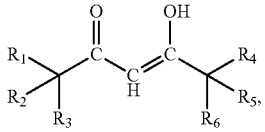

wherein $R_1$, $R_2$, and $R_3$ independently of each other are hydrogen, halogen, $C_1$-$C_{20}$ alkyl, or $C_6$-$C_{14}$ aryl which is unsubstituted or substituted by one, two or three $C_1$-$C_8$ alkyl, halogen, $OR_{12}$ or $NR_{13}R_{14}$; or
$R_1$, $R_2$ and $R_3$ together with the C-atom to which they are attached form a $C_6$-$C_{14}$ aryl group which is unsubstituted or substituted by one, two or three $C_1$-$C_8$ alkyl, halogen, $OR_{13}$, or $NR_{13}R_1$; and
$R_4$, $R_5$, and $R_6$ independently of each other are hydrogen, halogen, $C_1$-$C_{20}$ alkyl, or $C_6$-$C_{14}$ aryl which is unsubstituted or substituted by one, two or three $C_1$-$C_8$ alkyl, halogen, $OR_{13}$ or $NR_{13}R_{14}$; or
$R_4$, $R_5$ and $R_6$ together with the C-atom to which they are attached form a $C_6$-$C_{14}$ aryl group which is unsubstituted or substituted by one, two or three $C_1$-$C_8$ alkyl, halogen, $OR_{13}$, or $NR_{13}R_{14}$;
wherein
$R_{13}$ and $R_{14}$ independently of each other are $C_1$-$C_8$ alkyl.

2. A polymerizable composition comprising:
(a) at least one component which is capable of a polyaddition or polycondensation reaction in the presence of Lewis-acid type reactants; and
(b) at least one titanium-oxo-chelate catalyst compound of the formula I as defined in claim 1.

3. A polymerizable composition according to claim 2 comprising as component (a):
(a1) at least one blocked or unblocked isocyanate or isothiocyanate component, and
(a2) at least one polyol.

4. A polymerizable composition according to claim 2, comprising in addition to components (a) and (b) a further additive (d), which further addititve is a photosensitizer compound.

5. A polymerizable composition according to claim 2, which comprises 0.001 to 15% by weight, of the titanium-oxo-chelate catalyst compound of the formula I as defined in claim 1, based on the total composition.

6. A coated substrate coated on at least one surface with a composition according to claim 2.

7. A polymerized or crosslinked composition according to claim 2.

8. A process for polymerizing compounds, which are capable of crosslinking in the presence of a Lewis acid, characterized in that the titanium-oxo-chelate catalyst compound of formula I as defined in claim 1 is added to the compounds which are capable to crosslink in the presence of a Lewis acid and the resulting mixture is irradiated with electromagnetic radiation of a wavelength range of 200-800 nm.

9. A process according to claim 8, characterized in that instead of irradiating with electromagnetic radiation the mixture is subjected to a heat treatment, or the mixture is irradiated with electromagnetic radiation and simultaneously with or after the irradiation subjected to a heat treatment.

10. A process according to claim 8 for the preparation of adhesives, sealings, coatings, potting components, printing inks, printing plates, foams, moulding compounds, or photostructured layers.

11. A titanium-oxo-chelate catalyst formulation, comprising
(i) a compound of formula

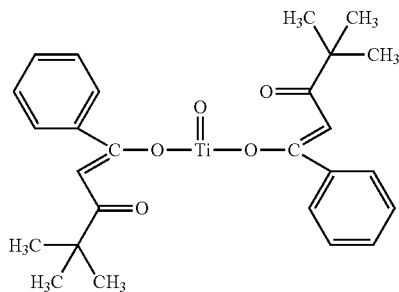

and
(ii) a chelate ligand compound of formula

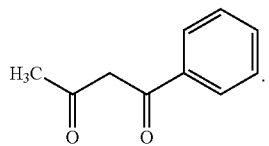

12. A titanium-oxo-chelate catalyst formulation according to claim 1, comprising
(i) at least one compound of formula I, wherein
$R_1$, $R_2$, and $R_3$ together with the C-atom to which they are attached form a phenyl group which is unsubstituted or substituted by one, two, or three $C_1$-$C_8$alkyl, halogen, $OR_{13}$, or $NR_{13}R_{14}$;
$R_{10}$, $R_{11}$, and $R_{12}$ together with the C-atom to which they are attached form a phenyl group which is unsubstituted or substituted by one, two, or three $C_1$-$C_8$ alkyl, halogen, $OR_{13}$, or $NR_{13}R_{14}$;
$R_4$, $R_5$, $R_6$, $R_7$, $R_8$, $R_9$ independently of each other are hydrogen, halogen, $C_1$-$C_{20}$ alkyl, or $C_6$-$C_{14}$ aryl which is unsubstituted or substituted by one, two or three $C_1$-$C_8$ alkyl, halogen, $OR_{13}$, or $NR_{13}R_{14}$; or
$R_4$, $R_5$, and $R_6$ and/or $R_7$, $R_8$, and $R_9$ together with the C-atom to which they are attached form a $C_6$-$C_{14}$ aryl group which is unsubstituted or substituted by one, two or three $C_1$-$C_8$ alkyl, halogen, $OR_{13}$, or $NR_{13}R_{14}$; or
$R_4$ and $R_5$ and/or $R_7$ and $R_8$ together with the C-atom to which they are attached form a 5- to 7- membered carbocyclic ring; and
(ii) at least one chelate ligand compound of the formula IIa, IIb, or IIc, wherein
$R_1$, $R_2$, and $R_3$ independently of each other are hydrogen, halogen, or $C_1$-$C_{20}$ alkyl; or
$R_1$, $R_2$ and $R_3$ together with the C-atom to which they are attached form a phenyl group which is unsubstituted or substituted by one, two or three $C_1$-$C_8$ alkyl, halogen $OR_{13}$, or $NR_{13}R_{14}$; and
$R_4$, $R_5$, and $R_6$ independently of each other are hydrogen, halogen, $C_1$-$C_{20}$ alkyl; or
$R_4$, $R_5$ and $R_6$ together with the C-atom to which they are attached form a phenyl group which is unsubstituted or substituted by one, two or three $C_1$-$C_8$alkyl, halogen $OR_{13}$, or $NR_{13}R_{14}$;
wherein
$R_{13}$ and $R_{14}$ independently of each other are $C_1$-$C_8$ alkyl.

13. A titanium-oxo-chelate catalyst formulation according to claim 1, comprising
(i) at least one compound of formula I, wherein
$R_1$, $R_2$, and $R_3$ together with the C-atom to which they are attached form a phenyl group which is unsubstituted or substituted by one, two, or three $C_1$-$C_4$alkyl, $OR_{13}$, or $NR_{13}R_{14}$;
$R_{10}$, $R_{11}$, and $R_{12}$ together with the C-atom to which they are attached form a phenyl group which is unsubstituted or substituted by one, two, or three $C_1$-$C_4$ alkyl, $OR_{13}$, or $NR_{13}R_{14}$;
$R_4$, $R_5$, $R_6$, $R_7$, $R_8$, $R_9$ independently of each other are hydrogen, halogen, or $C_1$-$C_4$ alkyl; or
$R_4$, $R_5$, and $R_6$ and/or $R_7$, $R_8$, and $R_9$ together with the C-atom to which they are attached each form a phenyl group; or
$R_4$ and $R_5$ and/or $R_7$ and $R_8$ together with the C-atom to which they are attached form a cyclohexyl ring; and
(ii) at least one chelate ligand compound of the formula IIa, IIb, or IIc, wherein
$R_1$, $R_2$, and $R_3$ independently of each other are hydrogen, halogen, or $C_1$-$C_4$ alkyl; or
$R_1$, $R_2$ and $R_3$ together with the C-atom to which they are attached form a phenyl group; and
$R_4$, $R_5$, and $R_6$ independently of each other are hydrogen, halogen, or $C_1$-$C_4$ alkyl; or
$R_4$, $R_5$ and $R_6$ together with the C-atom to which they are attached form a phenyl group;
wherein
$R_{13}$ and $R_{14}$ independently of each other are $C_1$-$C_4$ alkyl.

* * * * *